(12) United States Patent
Honeycutt

(10) Patent No.: US 7,517,004 B2
(45) Date of Patent: Apr. 14, 2009

(54) AIR DEFLECTING SYSTEM FOR AUTOMOBILES

(75) Inventor: Daniel Barry Honeycutt, Salisbury, NC (US)

(73) Assignee: National Association for Stock Car Auto Racing, Inc., Daytona Beach, FL (US)

( * ) Notice: Subject to any disclaimer, the term of this patent is extended or adjusted under 35 U.S.C. 154(b) by 0 days.

(21) Appl. No.: 11/561,222

(22) Filed: Nov. 17, 2006

(65) Prior Publication Data

US 2008/0116717 A1 May 22, 2008

(51) Int. Cl.
*B60J 1/00* (2006.01)

(52) U.S. Cl. ................... 296/180.1; 296/180.5

(58) Field of Classification Search .............. 296/180.1, 296/180.5, 91; 244/130, 2, 49
See application file for complete search history.

(56) References Cited

U.S. PATENT DOCUMENTS

| | | | | |
|---|---|---|---|---|
| 3,837,395 A * | 9/1974 | Coolidge | ...................... | 165/47 |
| 4,486,046 A | 12/1984 | Whitney et al. | | |
| 4,558,898 A * | 12/1985 | Deaver | .................... | 296/180.1 |
| 4,772,062 A | 9/1988 | Janssen et al. | | |
| 5,056,860 A * | 10/1991 | Cornacchia et al. | ...... | 296/180.5 |
| 5,061,007 A * | 10/1991 | Simpson | .................. | 296/180.5 |
| 5,236,242 A * | 8/1993 | Seeman | .................... | 296/180.1 |
| 5,280,990 A | 1/1994 | Rinard | | |
| 5,419,608 A | 5/1995 | Takemoto | | |
| 5,678,884 A * | 10/1997 | Murkett et al. | ........... | 296/180.1 |
| 5,685,597 A * | 11/1997 | Reid | ........................ | 296/180.1 |
| D422,544 S * | 4/2000 | Carlson et al. | ............. | D12/181 |
| 6,196,620 B1 | 3/2001 | Haraway, Jr. | | |
| 6,293,613 B1 * | 9/2001 | Choi | ....................... | 296/180.1 |
| 6,520,564 B1 * | 2/2003 | Liang | ....................... | 296/180.5 |
| 6,805,399 B1 * | 10/2004 | Brown et al. | ............. | 296/180.5 |
| 7,052,074 B2 * | 5/2006 | Dringenberg et al. | ..... | 296/180.5 |
| 7,201,432 B2 * | 4/2007 | Roth | ........................ | 296/180.5 |
| 7,213,870 B1 * | 5/2007 | Williams | .................. | 296/180.5 |
| 7,226,117 B2 * | 6/2007 | Preiss | ....................... | 296/180.1 |
| D547,249 S * | 7/2007 | Kurtz et al. | ................. | D12/196 |

FOREIGN PATENT DOCUMENTS

| DE | 36 25 814 A1 | 2/1988 |
|---|---|---|
| EP | 0 601 292 A1 | 6/1994 |

OTHER PUBLICATIONS

Jayski's Silly Season Site, Car of Tomorrow—COT, available at http://jayski.com/teams/car-future.htm (Nov. 17, 2006), 20 pages.

(Continued)

*Primary Examiner*—Kiran B. Patel
(74) *Attorney, Agent, or Firm*—Alston & Bird LLP

(57) ABSTRACT

Various embodiments of the present invention are directed to an air deflecting system positioned on an automobile and configured to produce an increased side force and/or a more favorable yawing moment when the automobile is cornering or is otherwise yawed relative to the direction of the free stream air flow. In one exemplary embodiment, the deflecting system comprises a downforce-producing horizontal rear wing located proximate the rear end of the automobile, the rear wing having an endplate on each end. In one embodiment, the endplates are angled or have cambered airfoil cross-sections such that they each generate an aerodynamic force towards the inside of a turn when the automobile is cornering.

22 Claims, 17 Drawing Sheets

OTHER PUBLICATIONS

Jayski's Silly Season Site, COT—Car of Tomorrow Images, available at http://jayski.com/schemes/2006/cot.htm (Nov. 17, 2006), 12 pages.

Show Airfoil(s), NASG Airfoil Database, available at http://www.nasg.com/afdb/show-airfoil-e.phtom?id=1192; (Nov. 17, 2006), 1 page.

* cited by examiner

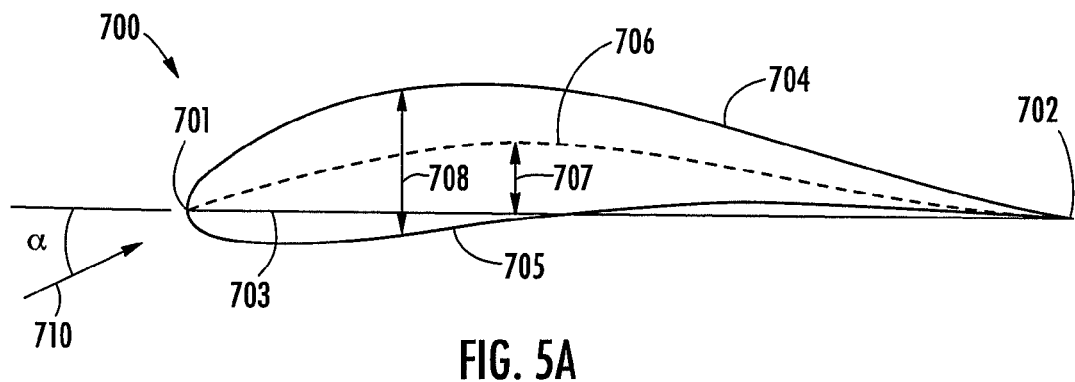
FIG. 5A
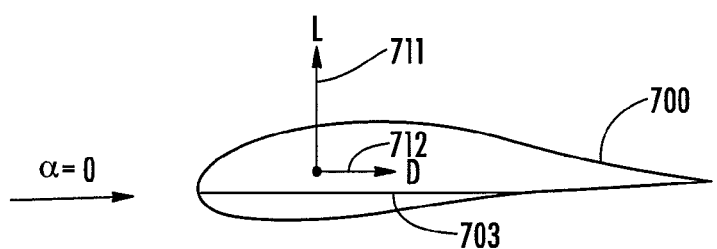
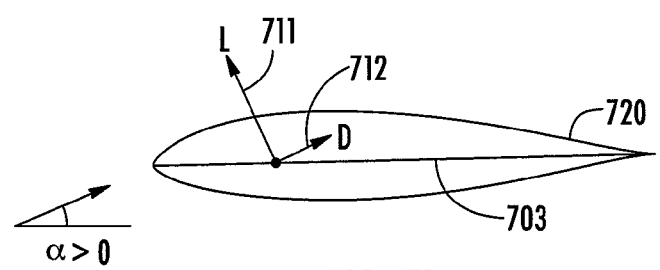
FIG. 5B

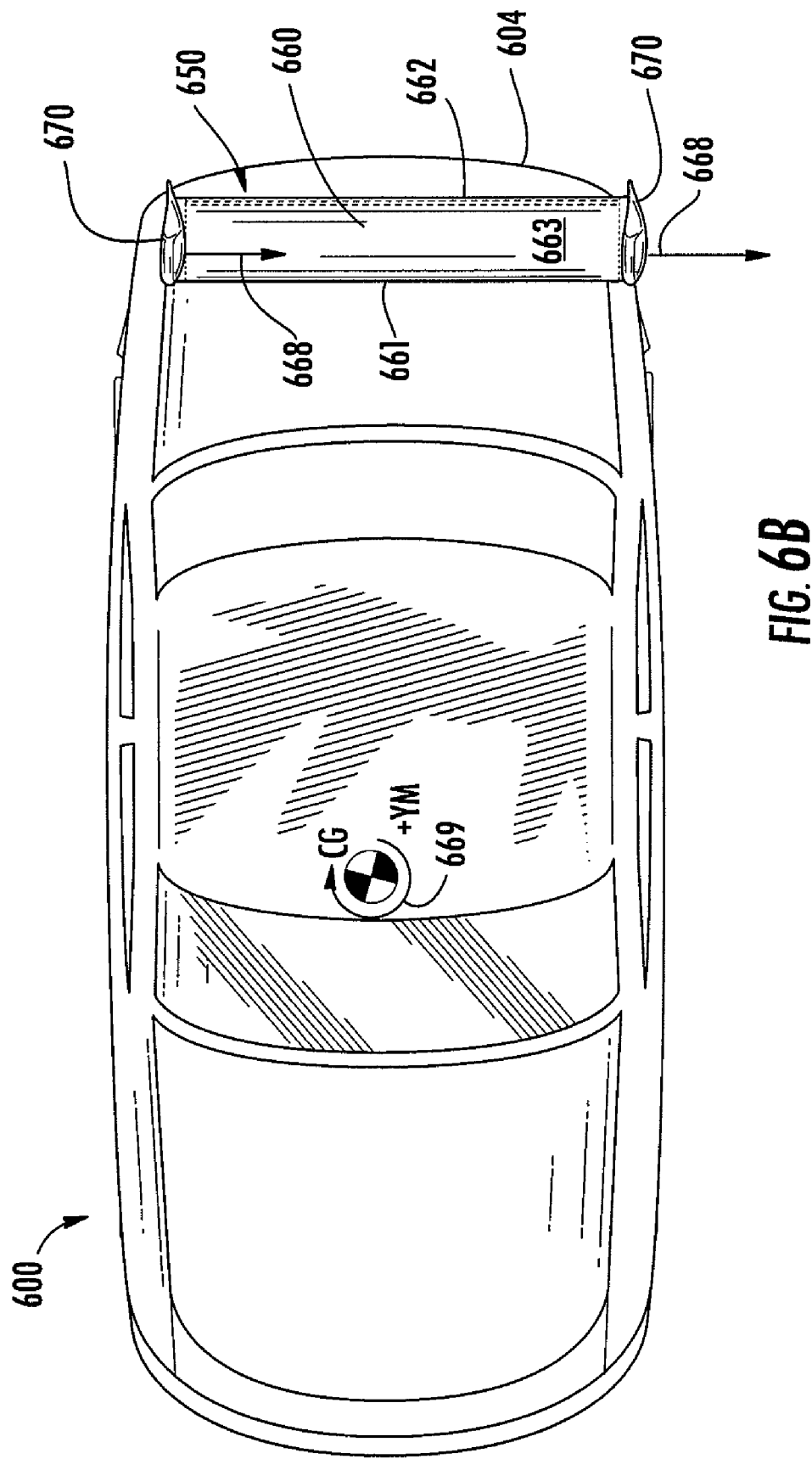

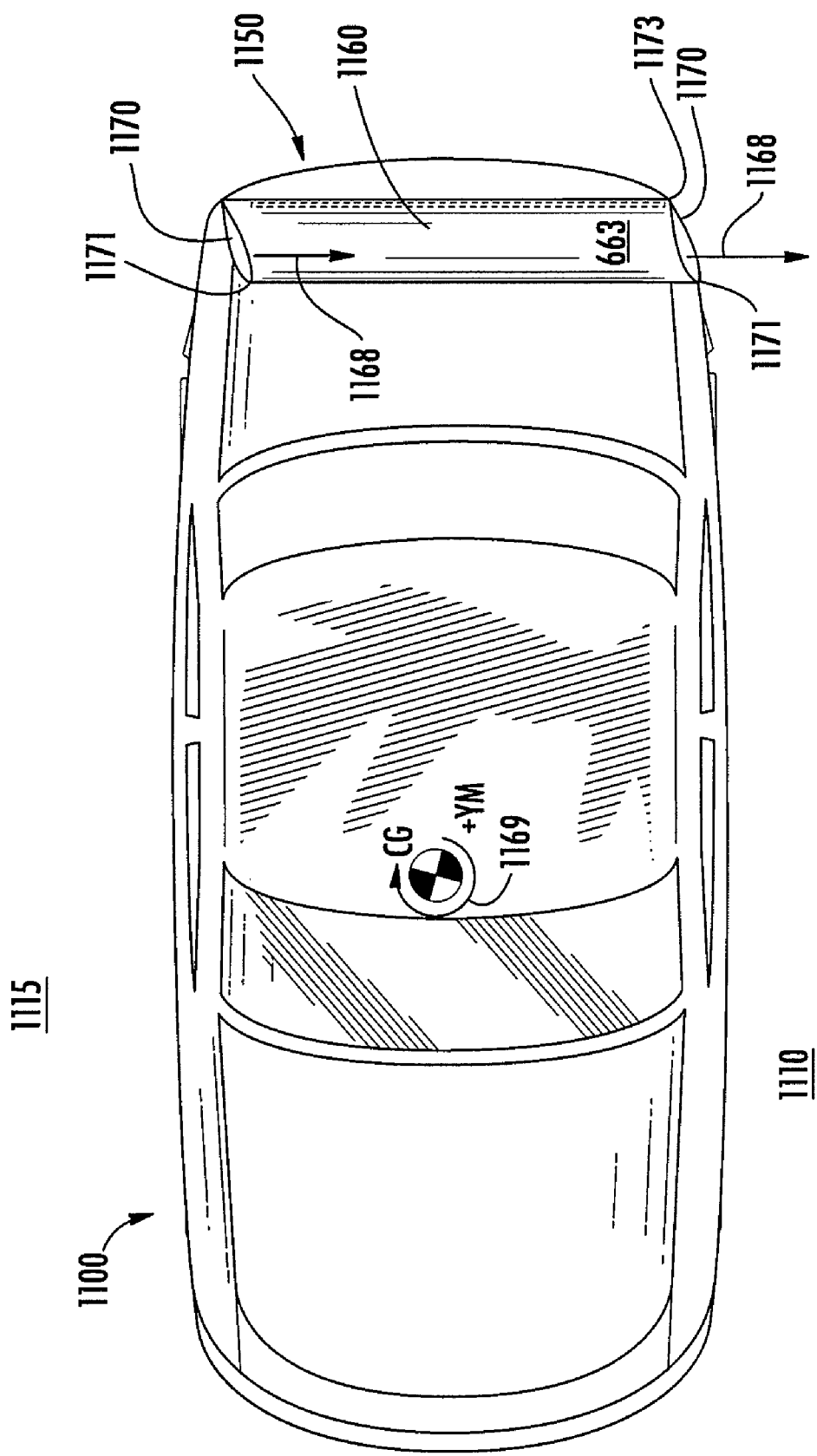

AIR DEFLECTING SYSTEM FOR AUTOMOBILES

FIELD OF THE INVENTION

The present invention relates generally to automobile aerodynamics, and more particularly to an air deflector positioned on an automobile and configured to produce aerodynamic forces that favorably affect the forces on an automobile during cornering or when otherwise yawed.

BACKGROUND OF THE INVENTION

Aerodynamic forces are commonly used by automotive engineers to enhance automobile performance, safety, and fuel economy. Engineers shape the body contour of an automobile to create and enhance certain aerodynamic forces. In one example, many racing and high-performance automobiles are equipped with rear spoilers that produce downforce or "negative lift" proximate the rear end of the vehicle. Such downforce improves the automobile's traction or ability to hold the road. However, in addition to adding desirable downforce, rear spoilers sometimes add performance-reducing drag to the automobile. This trade-off effectively illustrates the need for automotive engineers to have a detailed picture of the aerodynamic forces acting on a vehicle in motion.

FIG. 1 depicts an exemplary automobile 100 (e.g., a racecar) for illustrating a coordinate axis that is commonly used to model aerodynamic forces acting on an automobile in motion. The depicted coordinate axis is centered at the automobile's center of gravity ("CG"). An x-axis proceeds from the CG along the longitudinal axis of the automobile as shown. A y-axis proceeds in a lateral direction perpendicular to the longitudinal axis of the automobile. A z-axis proceeds in a vertical direction perpendicular to both the x- and y-axes as shown. The depicted coordinate system is used herein to describe embodiments of the present invention.

The primary aerodynamic forces acting on a moving automobile (or on an automobile placed in a wind tunnel) are drag, positive and negative sideforce, lift, and downforce (negative lift). In view of the depicted coordinate axes, drag is applied to the automobile in a direction along the negative x-axis. Positive and negative sideforces are applied in directions along the positive and negative y-axis respectively. Lift is applied in a direction along the negative z-axis while downforce is applied in a direction along the positive z-axis. The primary aerodynamic moments acting on a moving automobile are roll, pitch, and yaw. Roll is the moment defined about the x-axis, pitch is the moment defined about the y-axis, and yaw is the moment defined about the z-axis.

Air moving over an automobile produces pressure gradients and viscous friction that combine to create aerodynamic forces and moments applied in each of the directions noted above. The precise nature of the aerodynamic forces applied to the automobile depends on a variety of factors including the velocity and density of the air flow, the shape of the automobile, and the orientation of the automobile relative to the direction of the air flow.

When an automobile corners it must rotate about its z-axis and translate its center of mass along an arc. In this regard, the automobile's direction of motion becomes angled or "yawed" relative to an incoming airflow. An automobile may also become yawed relative to the incoming airflow when the automobile encounters a crosswind or when the automobile is yawed in a wind tunnel. This yawed orientation is illustrated in FIG. 2A. Streamlines 105 provide a visual illustration of the airflow as it travels around the automobile body 200. The airflow approaches the automobile 200 in a direction defined by flow arrow F as shown. The automobile 200 includes an imaginary longitudinal axis 150 that divides the automobile 200 and the area around the automobile into two parts, namely, a passenger side 115 and a driver side 110. The automobile 200 also includes a leading edge and a trailing edge defined by lines A and B, respectively. The longitudinal axis 150 of the depicted automobile 200 is yawed relative to the incoming air flow by an angle $\theta$.

FIG. 2B provides a simplified illustration of the relative pressures applied to the yawed automobile 200 depicted in FIG. 2A. Relative pressure profiles for air passing over the driver and passenger sides of the automobile are shown by plotting the pressure coefficient $C_p$ (non-dimensionalized pressure) for locations along each side of the automobile versus a distance x from the leading edge of the automobile along the x-axis for each locations. The distances x along the x-axis are also non-dimensionalized by dividing the distance by the length of the automobile L. The pressure coefficient axis in the graph has been inverted as is conventional. The pressure profile around each side of the automobile when the yaw angle $\theta$ equals zero is represented by a solid line and the pressure profiles when the automobile is yawed at a negative (counter-clockwise) yaw angle relative to the incoming airflow F are represented by dashed lines.

Turning first to the passenger side pressure coefficient profile PP when the automobile is yawed (as represented by the dashed-dotted line), as the air moves from the front end of the automobile around its right front quarter-panel the pressure is reduced (i.e., becomes more negative) and then plateaus along the side of the automobile. As air moves from the right rear quarter panel around the rear end of the automobile the airflow separates from the vehicle and the pressure drops again. Turning to the driver side pressure profile DP, the pressure decreases rapidly as the air flow is separated from the automobile when rounding the corner defined between the front end of the automobile and the left front quarter-panel as shown.

The aerodynamic pressures of a yawed automobile 200, such as the pressures illustrated in FIG. 2B, often have a net effect of producing a moment applied to the automobile 200 about the center of gravity. As illustrated in FIG. 2B, when the automobile 200 is oriented at a negative yaw angle relative to an incoming airflow the pressure produced proximate the front driver side of the automobile is generally much lower than the pressure produced proximate the front of the passenger side. As a result, a negative yawing moment YM is applied to the automobile 200 as illustrated in FIG. 3A. Positioning a symmetric automobile at a positive yaw angle relative to an incoming airflow has the opposite effect, creating a positive yawing moment about the automobile's CG. Any yawing moments caused by the aerodynamic forces must generally be resisted by friction occurring between the automobile's wheels and the road surface to maintain the automobile on its intended path.

Additional forces, apart from aerodynamic forces, also act on a cornering automobile. For example, when an automobile is cornering, the automobile's forward inertia tends to carry it forward in a straight line. To overcome the automobile's inertia and maintain the automobile on a cornering trajectory, a centripetal force is generally provided by friction occurring between the automobile's wheels and the road surface.

FIG. 3B illustrates a front view of the automobile 200 making a left-hand turn. The forces 300 applied to the automobile from the tires gripping the road are directed towards the inside of the turn. These forces are located below the automobile's center of gravity and therefore cause a positive rolling moment 302. This rolling moment 302 is usually undesirable in that it makes the vehicle more prone to a rollover and also reduces the weight or downward pressure on the inside tires 303 thereby reducing the ability of the inside tires 303 to grip the road.

FIG. 3C also illustrates the automobile 200 traveling around a left-hand corner. As described above, the four tires must provide the centripetal force toward the inside of the turn in order to allow the car to travel along the arc of the turn. Depending on many factors, such as how the vehicle enters the turn and how the throttle is applied, the rear tires 304 may be required to produce a greater side force 306 than side force 307 required of the front tires 305, or vice versa. As also described above with respect to FIG. 3A, the aerodynamic forces on the cornering automobile making a left-hand turn often result in a negative yawing moment 308 that increases the force 306 that rear tires 304 must resist and decrease the force 307 that the front tires 305 must resist. In high speed racing applications, the combination of the negative yawing moment 308 and the automobile's inertia may exceed the tires' ability to grip the surface of the road resulting in a slide or a "spin-out" of the racecar.

For example, if the magnitude of the side force 306 required of the rear tires 304 is greater than the side force that the rear tires 304 can withstand, the rear of the vehicle will slide toward the outside of the turn, potentially resulting in a spin-out of the automobile. This is generally referred to as "oversteer." A driver may describe a car that is more prone to oversteer as being "loose." Alternatively, if the magnitude of the side force 307 required of the front tires 305 is greater than the side force that the front tires 305 can withstand, the front of the vehicle will slide toward the outside of the turn or the vehicle will simply continue in a straight line and not follow the arc of the turn. This is generally referred to as "understeer." A driver may describe a car that is more prone to understeer as being "tight." However, even if the tires can effectively resist the yawing moments and the inertial energy produced during cornering without causing the automobile to over or under steer, the high heat and friction that results in the tires may prematurely degrade and wear some or all of the tires.

Horizontal wing devices or protruding air deflection devices often referred to as "spoilers" have been used on automobiles for purposes of creating additional downforce or reducing the vehicle's tendency to lift during certain operating conditions. Such horizontal wing devices generally have an inverted airfoil cross-section and have frequently been mounted on a rearward portion of an automobile, in order to provide improved rear-wheel traction and other enhanced handling characteristics at high speeds. These horizontal wings are generally not configured to provide a significant sideforce and are not intended for altering the yawing or rolling moments of the automobile.

It would be desirable then to provide an automobile design that tends to produce a more favorable yawing moment, rolling moment, and/or sideforce in order to reduce the stress on the tires during high speed cornering and/or in order to improve the handling characteristics of the automobile. It is also generally preferred that the body of the automobile appear generally symmetrical and aesthetically pleasing.

BRIEF SUMMARY OF THE INVENTION

The present invention provides an improved automobile design having greater aerodynamic stability during high speed cornering. Various embodiments of the present invention are particularly applicable to automobile racing applications; however, the inventive concepts herein described may be applied to a variety of non-racing vehicles including passenger cars, trucks, tractor trailers, and the like.

Various embodiments of the present invention are directed to air deflecting systems for automobiles that are adapted to turn in a turn direction (e.g., a left or counterclockwise turn such as those commonly taken by a racecar on a race track). Such air deflecting system embodiments may comprise a first sideforce controlling wing extending from (e.g., extending integrally from or coupled to) the automobile, wherein the first sideforce controlling wing is structured to generate aerodynamic forces having a first sideforce component when the automobile is generally aligned with an impinging airflow and a second sideforce component that is greater than the first sideforce component when the automobile is yawed in the turn direction relative to the impinging airflow.

Still other embodiments are directed to air deflecting systems that comprise: a downforce controlling wing coupled to the automobile; a first sideforce controlling wing extending from (e.g., extending integrally from or coupled to) the downforce controlling wing, wherein at least a portion of the first sideforce controlling wing defines an airfoil shaped cross-section; and a second sideforce controlling wing extending from (e.g., extending integrally from or coupled to) the downforce controlling wing, wherein at least a portion of the second sideforce controlling wing defines an airfoil shaped cross-section. In various embodiments, as will be discussed in detail below, the downforce controlling wing and/or the sideforce controlling wings may define cambered airfoil cross-sectional shapes.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5A is an illustration of an airfoil that may be used to define the cross-sectional shape of a wing for an air deflecting system structured in accordance with one embodiment of the present invention;

FIG. 5B is an illustration of two airfoils that may be used to define the cross-sectional shape of a wing for air deflecting systems structured in accordance with various embodiments of the present invention; FIG. 5B further illustrates forces that may be generated by the depicted airfoils;

FIG. 6B is a top view of an automobile having an air deflecting system according to one embodiment of the present invention;

FIG. 7 is a top view of an automobile having sideforce controlling wings with symmetric airfoils according to one embodiment of the present invention;

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 4:
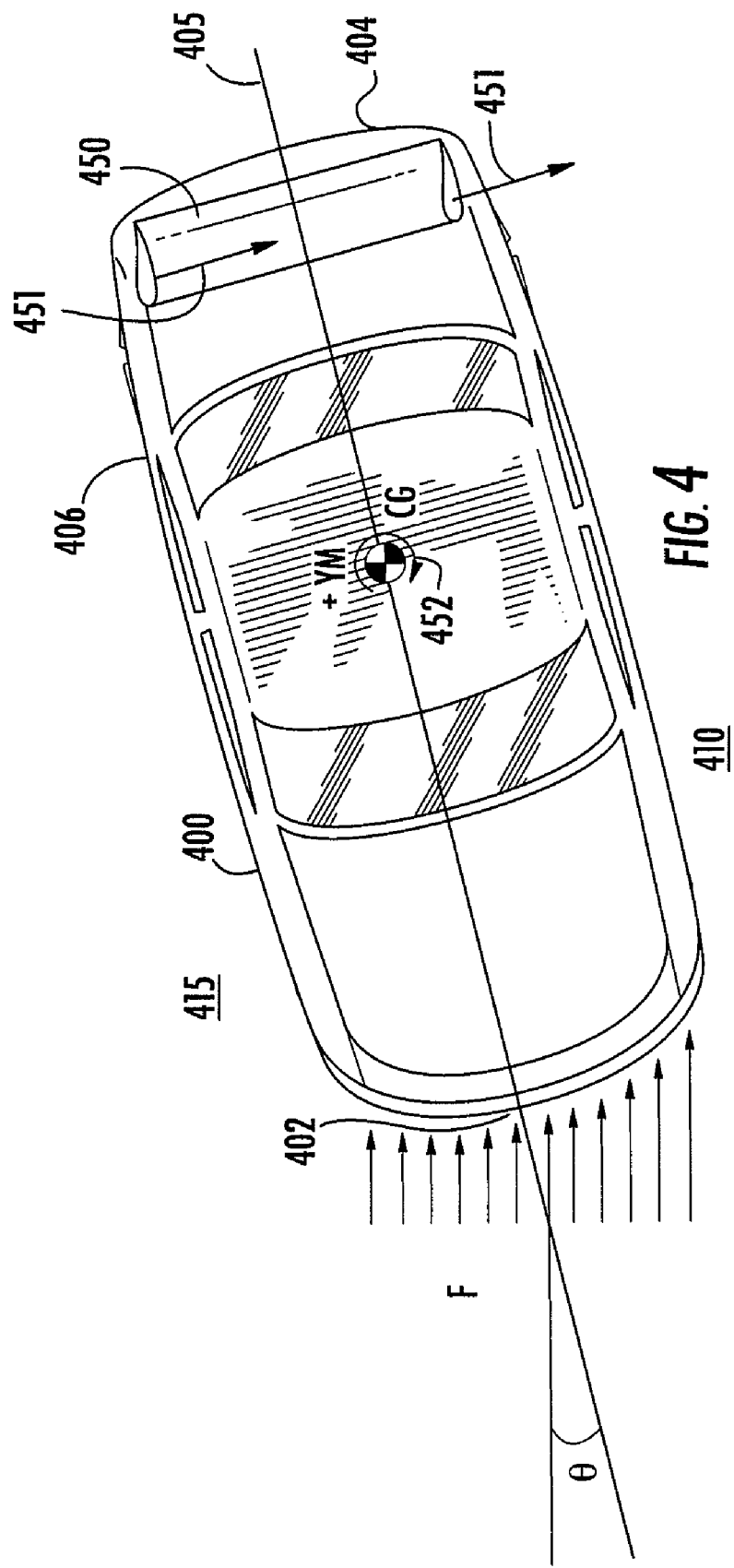
FIG. 4 is a top view of a yawed automobile having an air deflecting system structured in accordance with one embodiment of the present invention.

FIG. 4 depicts an air deflecting system 450 attached to an automobile 400 in accordance with one embodiment of the invention. As will be discussed in greater detail below, air deflecting systems structured according to various embodiments of the present invention may produce a number of desirable effects including an increased side force 451, a more favorable yawing moment 452, and/or a more favorable rolling moment (not shown) about the automobile's CG when the automobile is cornering or is otherwise yawed by an angle θ relative to an incoming airflow direction F.

In various embodiments, one or more of the desirable effects noted above may be produced using one or more wings having airfoil-shaped cross sections. Accordingly, the following description provides a brief and basic introduction of a few airfoil-related terms so that certain structures that may be associated with various embodiments of the present invention can be more clearly defined.

FIG. 5A illustrates an airfoil 700. The depicted airfoil 700 is comprised of a leading edge 701 and a trailing edge 702. A straight line drawn from the leading edge 701 to trailing edge 702 is called the chord line 703. The chord line 703 divides the airfoil into an upper surface 704 and a lower surface 705.

As will be apparent to one of ordinary skill in the art, if the points that lie halfway between the upper surface 704 and the lower surface 705 are plotted, a line called the mean camber line 706 is obtained. For a symmetric airfoil (where the upper surface has substantially the same shape as the lower surface) the mean camber line 706 will fall generally on top of the chord line 703. In the case of an asymmetric (or "cambered") airfoil, such as the depicted airfoil 700, the mean camber line 706 is different than the chord line 703. The maximum distance between the mean camber line 706 and the chord line 703 is called the maximum camber 707, which is a measure of the curvature of the airfoil. The maximum distance between the upper and lower surfaces is called the maximum thickness 708. Often these values are divided by the chord length 709 so that the airfoil may be described in terms of non-dimensional numbers.

Airfoils can be created having many different combinations of camber and thickness distributions. The geometry of a wing's airfoil is a major factor in determining the wing's performance characteristics. Likewise, the angle of attack α of the airfoil also affects the performance characteristics of the wing. The angle of attack α of the airfoil is defined as the angle between the impinging airflow 710 and the chord line 703. The flow arrow 710 illustrated in FIG. 5A illustrates a positive angle of attack α.

FIG. 5B illustrates forces that may be generated by air flowing around a cambered airfoil 700 at a zero-degree angle of attack and a symmetric airfoil 720 positioned at a positive angle of attack. Each of the depicted airfoils may generate an aerodynamic force extending from the aerodynamic center of the airfoil. Such forces possess a lift force component 711 perpendicular to the impinging airflow and a drag force component 712 in the direction of the impinging airflow. As is known in the art, the forces are often non-dimensionalized into a lift coefficient $C_l$ and a drag coefficient $C_d$ by dividing the force by the product of the dynamic pressure and a reference wing area, such as the chord length times a unit of wing width.

Figure 5C:
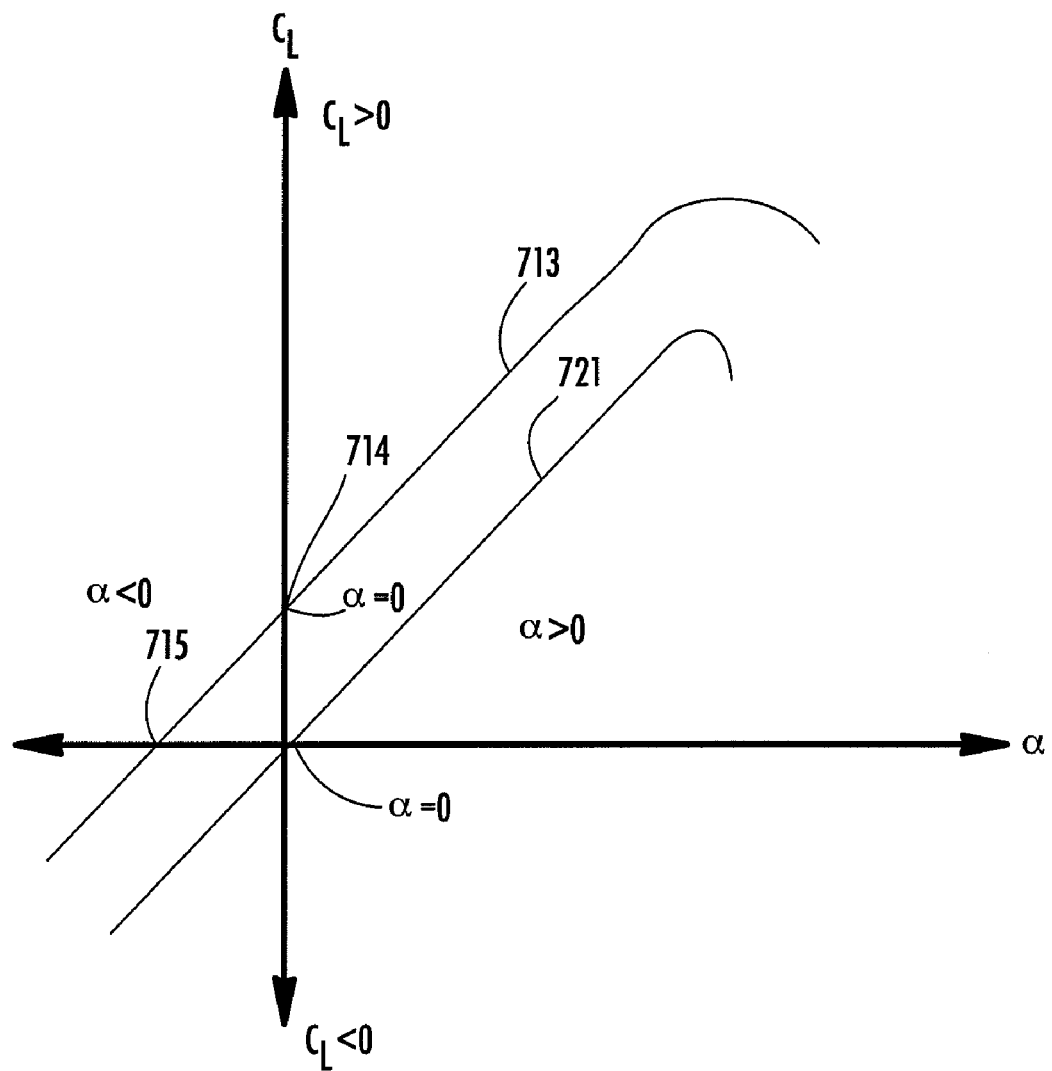
FIG. 5C is a simplified and exemplary graph depicting lift coefficient versus angle of attack graphs for the two airfoils depicted in FIG. 5B.

FIG. 5C is a graph that illustrates lift coefficient $C_l$ versus angle of attack α curves for the asymmetric cambered airfoil 700 and the symmetric airfoil 720. Curve 713 represents the $C_l$-alpha curve for the cambered airfoil and curve 721 illustrates $C_l$-alpha curve for the symmetric airfoil. As FIG. 5C illustrates, the lift coefficient $C_l$ increases with increasing angle of attack for both types of airfoil. Due to its symmetry, the symmetric airfoil 720 creates no lift when the angle of attack equals zero, creates a positive lift when the angle of attack α is positive, and creates a negative lift when the angle of attack α is negative.

In contrast to the symmetric airfoil 720, a cambered airfoil produces a non-zero lift coefficient at a zero degree angle of attack. For example, the positively cambered airfoil 700 produces a positive lift force at a zero degree angle of attack. Said differently, the $C_{l_{\alpha=0}}$ of curve 714 is positive. The lift force of a cambered airfoil is reduced to zero (i.e., $C_l$=0) only at a negative angle of attack (i.e., $\alpha_{C_l=0}$) as illustrated by point 715 of curve 713. At angles of attack less than $\alpha_{C_l=0}$, the positively cambered airfoil will produce negative lift. A negatively cambered airfoil can be thought of as an inverted positively cambered airfoil.

In terms of the basic $C_l$-alpha curve, a flat plate behaves similarly to a symmetric airfoil in that it creates no lift when the angle-of-attack equals zero, creates a positive lift when the angle-of-attack is positive, and creates a negative lift when the angle-of-attack is negative.

FIGS. 6A, 6B, 6C, and 6D illustrate an air deflecting system structured in accordance with one embodiment of the present invention. More particularly, FIGS. 6A, 6B, 6C, and 6D illustrate perspective, top, side, and rear views, respectively, of an automobile having an air deflecting system 650 structured according to one embodiment of the present invention. The air deflecting system 650 is positioned proximate the rear side 604 of an automobile 600. The depicted air deflecting system 650 includes a downforce controlling wing 660 and two sideforce controlling wings 670.

The "downforce controlling" wing 660 is structured to provide additional downforce for the automobile by providing a component aerodynamic force 667 in the positive z-direction for at least some automobile operating conditions. In the illustrated embodiment, the downforce controlling wing 660 is positioned on the automobile so that the leading and trailing edges of the wing are generally parallel to the plane defined by the automobile's x- and y-axes. In some embodiments, the downforce controlling wing 660 may be structured so that the leading and trailing edges 661 and 662, respectfully, of the wing are generally parallel to a road or other surface upon which the automobile is driving or being tested (e.g., wind tunnel applications, etc).

In the illustrated embodiment, the cross-section of the downforce controlling wing 660 comprises an inverted cambered airfoil (i.e., an airfoil where the maximum camber is on the positive z-side of the airfoil chord). In the illustrated embodiment, the downforce controlling wing 660 is positioned at some angle such that the airflow impinging on the wing is at an angle relative to the airfoil chord greater than some $\alpha_{C_l=0}$ when the automobile is traveling forward (i.e., in the positive x-direction). As described above, a cambered airfoil at an angle of attack greater than $\alpha_{C_l=0}$ relative to the impinging airflow produces a lift force perpendicular to the direction of the impinging airflow and a drag force in the direction of the airflow. The z-component of the lift and drag forces provide additional downforce for the automobile 600.

As will be apparent to one of ordinary skill in the art, the airflow impinging on the wing may or may not approach at the same angle relative to the automobile as the air approaching the automobile's leading edge. More particularly, the shape of the automobile body and the position of the wing relative to the automobile body may affect the direction at which an airflow approaches the wing.

The "sideforce controlling" wings 670 are structured to provide additional sideforce for the automobile by providing a component aerodynamic force 668 in the positive or negative y-direction for at least some automobile operating conditions. In the illustrated embodiment, the sideforce controlling wings 670 are positioned on the automobile so that the leading and trailing edges of the wings are generally perpendicular to the automobile's y-axis. In some embodiments, the sideforce controlling wing 670 may be structured so that the leading and trailing edges of the wing are generally perpendicular to a road or other surface upon which the automobile is driving or being tested.

In the illustrated embodiment, each sideforce controlling wing 670 defines a cross-section that is shaped as a cambered airfoil, such as the airfoil depicted in FIG. 5A, where the maximum camber is on the negative y-axis side (i.e., the driver side) of the airfoil chord. In the illustrated embodiment, the sideforce controlling wings 670 are positioned so that, when the automobile 600 is traveling generally forward, the impinging airflow is generally approaching at an angle relative to the airfoil chord that is greater than $\alpha_{C_l=0}$. As a result, a lift force perpendicular to the direction of the impinging airflow and a drag force in the direction of the impinging airflow is produced. The y-components of these lift and drag forces produce a sideforce 668 focused generally at the rear of the automobile as shown.

As noted above, one of skill in the art will appreciate that the airflow approaching the wing 670 may or may not approach at the same angle as the airflow approaching the leading edge of the automobile 600. More particularly, the shape of the automobile body and the position of the wings 670 relative to the automobile body may affect the direction of the airflow approaching the wings 670. Thus, the angle of attack a of the sideforce controlling wings 670 may not precisely match the yaw angle θ of the automobile.

The depicted sideforce controlling wings 670 are structured so that they each generate a sideforce 668 in the negative y-direction when the automobile 600 is positioned at a zero degree yaw angle θ relative to an impinging airflow (e.g., the automobile is driving in a straight line). When the automobile is yawed in the counter-clockwise direction relative to an impinging airflow, the angle of attack of each sideforce controlling wing 670 is increased thereby increasing the magnitude of the sideforce 668 generated by the sideforce controlling wings 670 (i.e., in this case, a sideforce 668 having an increased magnitude is a more negative sideforce since the sideforce was and still is directed in the direction of the negative y-axis). In this way, when an automobile 600 is cornering and is thereby yawed relative to the impinging airflow, the air deflecting system 650 creates a sideforce 668 that adds further centripetal force that may be needed to allow the automobile to corner at high velocities without spinning out and/or overly degrading its tires.

As will be appreciated by one of ordinary skill in the art, due to the fixed coordinate axes adopted in the present application, the sideforces may be positive or negative. As will also be appreciated, some embodiments of the air deflecting system may be structured to generate a side force in the direction of the positive y-axis, and other embodiments of the air deflecting system may be structured to generate a sideforce in the direction of the negative y-axis. Therefore, the term "greater than" as used herein, for example, in the expression "the first sideforce is greater than the second sideforce" or the expression "the first sideforce is increased relative to the second sideforce," refers to: (1) a negative Δ sideforce for air deflecting systems structured for automobiles making a left-hand turn, where "Δ sideforce" is defined as the difference between the first sideforce and the second sideforce; and (2) a positive Δ sideforce for air deflecting systems structured for automobiles making a right-hand turn.

In this regard, Table 1 illustrates how the sideforce generated by the air deflecting system may change in accordance with various embodiments of the present invention. As will be appreciated by one of ordinary skill in the art, the sideforce generated by the air deflecting system may be negative, zero, or positive when the automobile is traveling straight (i.e., not yawed relative to the incoming flow). Such sideforces are referred to in the table as "aligned sideforces." Also referred to in the table, a "yawed sideforce" is a sideforce generated by the air deflecting system when the automobile is turned in a turn direction that the air deflecting system is designed for.

As illustrated in Table 1, for embodiments of the air deflecting system designed for an automobile making a left-hand turn (i.e., yawed counterclockwise relative to the incoming airflow), if the aligned force is negative, then the yawed sideforce is more negative (i.e., in the negative direction and having a greater absolute) than the aligned sideforce. If the aligned sideforce is zero, then the yawed sideforce is negative. If the aligned sideforce is positive, then the yawed sideforce may be either negative or less positive (i.e., in the positive direction and having a smaller absolute value) than the aligned sideforce. In other words, where embodiments of the invention are structured to produce an increased sideforce when an automobile is making a left-hand turn, the difference between the yawed sideforce and the aligned sideforce (i.e. "Δ sideforce") is negative.

As further illustrated in Table 1, for embodiments of the air deflecting system structured for an automobile making a right-hand turn (i.e., yawed clockwise relative to the incoming airflow), if the aligned force is positive, then the yawed sideforce is more positive (i.e., in the positive direction and having a greater absolute value) than the aligned sideforce. If the aligned sideforce is zero, then the yawed sideforce is positive. If the aligned sideforce is negative, then the yawed sideforce may be either positive or less negative (i.e., in the negative direction and having a smaller absolute value) than the aligned sideforce. In other words, where embodiments of the invention are structured to produce an increased sideforce when an automobile is making a right-hand turn, the Δ sideforce is positive.

TABLE 1

| Air Deflecting System | Aligned Sideforce | Yawed Sideforce | Δ Sideforce |
| --- | --- | --- | --- |
| Left-hand turn (counterclockwise yaw) | negative | more negative | negative |
| | zero | negative | negative |
| | positive | negative | negative |
| | positive | less positive | negative |
| Right-hand turn (clockwise yaw) | positive | more positive | positive |
| | zero | positive | positive |
| | negative | positive | positive |
| | negative | less negative | positive |

Figure 6A:
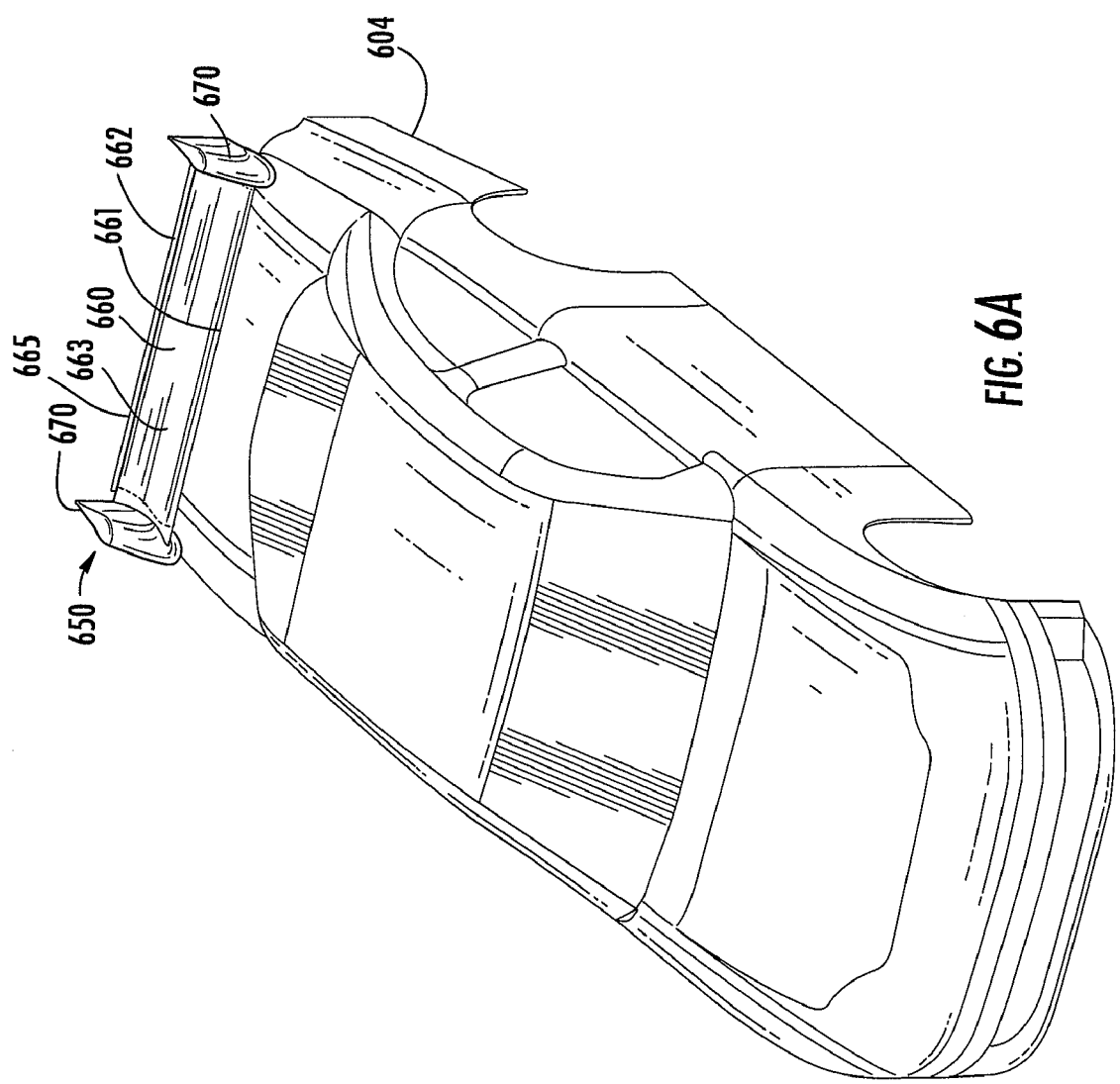
FIG. 6A is a perspective view of an automobile having an air deflecting system according to one embodiment of the present invention.
Figure 6C:
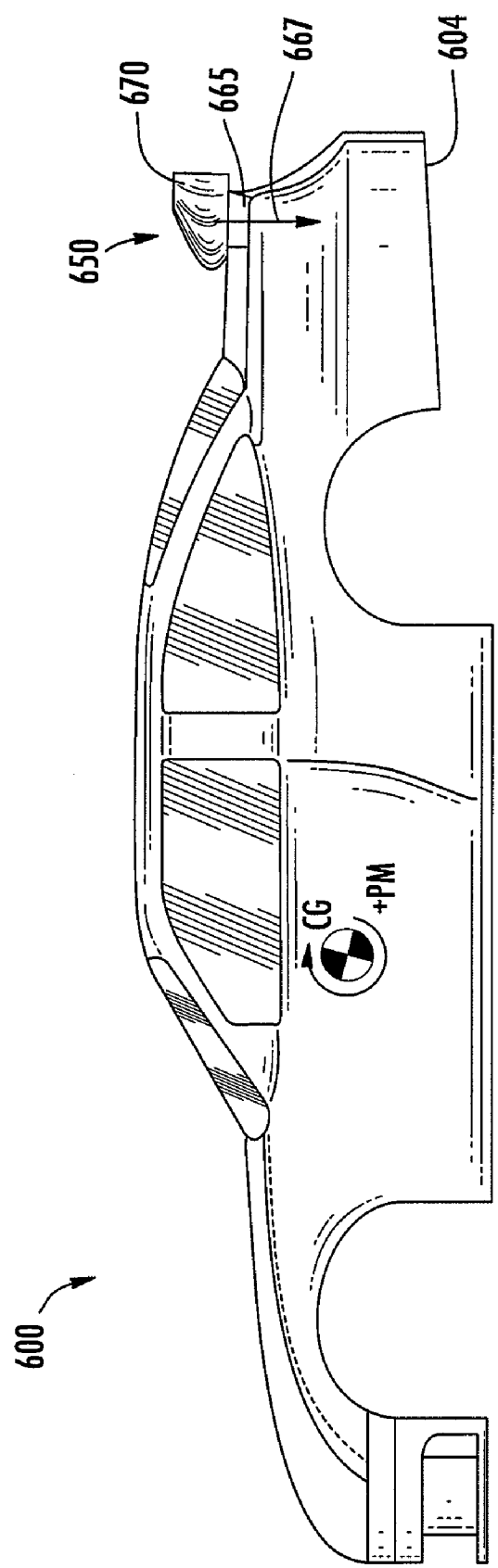
FIG. 6C is a side view of an automobile having an air deflecting system according to one embodiment of the present invention.
Figure 6D:
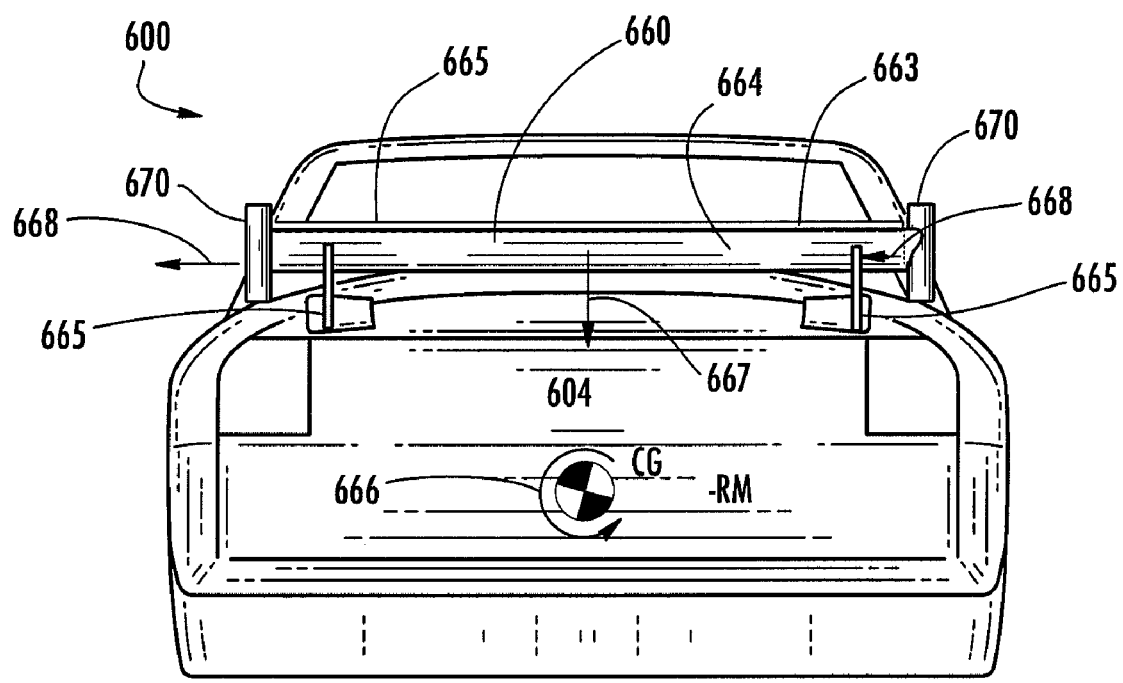
FIG. 6D is a rear view of an automobile having an air deflecting system according to one embodiment of the present invention.

Referring again to the embodiment illustrated in FIGS. 6B, 6C, and 6D, the depicted air deflecting system 650 is positioned above the rear end 604 of the automobile 600 in a position rearward and above the automobile's CG. Accordingly, the sideforce 668 generated by the air deflecting system 650 creates a positive yawing moment 669 and a negative rolling moment 666 about the automobile's CG. In this way, the air deflecting system may be used to create a "tighter" automobile that has a yawing moment that tends to push the rear end 604 of the automobile 600 towards the inside of the turn. Thus, embodiments of the air deflecting system 650 may be used to reduce or eliminate the effect of an unfavorable yawing moment caused by the aerodynamic forces of the rest of the automobile and/or may be used to otherwise change the handling characteristics or "feel" of the automobile.

It is noted, as will be apparent to one of skill in the art, moments about the CG of an automobile as produced by air deflecting systems structured according to various embodiments of the invention do not refer to the "total" moment of the automobile unless specifically described as such. Rather, such moments refer only to those produced by aerodynamic forces generated by the air deflecting systems. Said differently, air deflecting systems structured according with various embodiments of the present invention may produce a positive yawing moment about the CG while the total yawing moment of the automobile may be positive or negative. In circumstances where the total yawing moment of the automobile is negative and the air deflecting system produces a positive yawing moment, the air deflecting system created moment may serve simply to reduce the magnitude of the total yawing moment.

As noted above, a cornering automobile may develop an unfavorable rolling moment that tends to lift the tires closest to the inside of the turn off of the ground (i.e., a positive rolling moment when the automobile is making a left-hand turn and a negative rolling moment when the automobile is making a right-hand turn). The depicted air deflecting system 650 is positioned above the automobile's center of gravity and is configured such that the y-component 668 of the force generated by the air deflecting system 650 is directed generally towards the inside of the turn. As such, the y-component 668 of the force creates a positive rolling moment 666 tending to counter the negative rolling moment caused by the momentum of the automobile's mass when cornering. Thus, air deflecting systems structured in accordance with various embodiments of the present invention may produce a rolling moment 666 that tends to increase the downward force acting on the automobile's inside tires.

Automobiles equipped with the illustrated air deflecting system 650 are generally configured to have improved cornering performance when making a left-hand turn. As will be appreciated by one of ordinary skill in the art, such air deflecting systems may be particularly useful for automobiles intended for racing events conducted on circular, oval, or other tracks shaped generally of left-hand turns. It will be further appreciated by one of ordinary skill in the art, that the profile of sideforce controlling wings may be reversed on air deflecting systems structured for placement on automobiles intended for racing events that are conducted on tracks shaped generally of right-hand turns.

In the depicted embodiment, the sideforce controlling wings 670 extend from the ends of the downforce controlling wing 660. Configured as such, the sideforce controlling wings 670 may serve as endplates for the downforce controlling wing 660. Using the sideforce controlling wings 670 as endplates for the downforce controlling wing 660 may increase the downforce 667 generated by the downforce controlling wing 660 by preventing at least some of the air flowing over the upper surface 663 of the downforce controlling wing 660 (an area of generally higher pressure) from wrapping around the ends of the wing 660 to the lower surface 664 of the wing 660 (an area of generally lower pressure).

In other embodiments, the sideforce controlling wings may be removed from the downforce controlling wing and instead positioned to extend directly from the main body of the automobile or from other structures attached to the main body of the automobile (not shown). In such embodiments, the air deflecting system may not include a downforce controlling wing.

The downforce controlling wing 660 depicted in FIG. 6D is attached to the automobile 600 by one or more struts 665. The struts 665 anchor the downforce controlling wing 660 above the rear end 604 of the automobile thereby exposing each of the wings 660 and 670 of the air deflecting system 650 to airflow passing over the rear end 604 of the automobile 600. The struts 665 also perform the function of transferring any aerodynamic forces generated by the air deflecting system 650 to the main body of the automobile. In one embodiment, the sideforce controlling wings may extend from the main body of the automobile and may support the downforce controlling wing as an alternative to, or perhaps an addition to, the struts.

Although FIGS. 6A-6D illustrate an embodiment where both sideforce controlling wings 670 and the downforce controlling wing 660 all comprise cambered airfoils, other embodiments of the air deflecting system may be structured such that one or more of the wings have symmetric airfoil cross-sections or perhaps are shaped as flat plates positioned at various angles of attack.

In some embodiments of the present invention, the sideforce controlling wings may be positioned so that the airfoils define a zero degree angle of attack relative to an impinging airflow encountered by the sideforce controlling wings when the automobile is not yawed. Additionally, the sideforce controlling wings may be placed at some positive or negative angle of attack relative to an impinging airflow encountered by the sideforce controlling wings when the automobile is not yawed.

Likewise, the sideforce controlling wings may be positioned at various angles of attack relative to the longitudinal axis of the automobile. For example, FIG. 7 illustrates one embodiment of the present invention in which sideforce controlling wings 1170 may have symmetric airfoil cross-sections and are each positioned with respect to the automobile 1100 so that the leading edge 1171 of each airfoil is closer to the driver side 1110 of the automobile than the trailing edge 1173, which is closer to the passenger side 1115 of the automobile than the leading edge 1171. Positioned as such, both sideforce controlling wings 1170 may produce a sideforce 1168 directed toward the driver's side 1115 (i.e., in the direction of the negative y-axis) of the automobile 1100 when running straight (i.e., when the automobile is not yawed relative to an incoming airflow). A "greater" sideforce (i.e., in this case a more negative sideforce) would likely be produced by sideforce controlling wings 1170 structured as set forth above when the automobile is cornering to the left (i.e., yawed in the counter-clockwise direction relative to an incoming airflow), at least, that is, assuming that the sideforce controlling wings are positioned to avoid completely stalling during cornering.

In some embodiments of the present invention, the chords of the sideforce controlling wings are parallel to each other, while in other embodiments, the chords are not parallel to each other. For example, in some situations it may be desirable to have the chords at different angles of attack relative to the airflow approaching the automobile since, in some situations, the airflow actually impinging on one sideforce controlling wing may be at a different angle and have different properties than the airflow actually impinging on another sideforce controlling wing. For the same reasons, in some situations it may be desirable to use a different airfoil on one sideforce controlling wing than the airfoil on another sideforce controlling wing. However, where aesthetics of the automobile are important, it may be more desirable in some situations to have sideforce controlling wings that look the same and that are parallel to one another even if such a configuration might not produce the optimal amount of sideforce.

Although embodiments of the present invention may comprise wings having a variety of cross-sections, it may be preferable to use cambered airfoils as the cross-section of the sideforce controlling wings since cambered airfoils often produce a lower drag coefficient for a given lift coefficient compared to a symmetric airfoil. Cambered airfoils often can be structured to generate a higher lift coefficient than a symmetric airfoil or a flat plate.

In some embodiments of the present invention, the sideforce controlling wing(s) may comprise flaps, slats, or vortex generators. For example, a sideforce controlling wing may comprise a "Gurney flap." A Gurney flap, also known as a "wicker" or a "wicker bill," is generally a plate that extends along at least a portion of the trailing edge of a wing and extends generally perpendicular to the airfoil chord line on the "lower" surface (i.e., the high pressure side) of the airfoil. The Gurney flap may produce a separation bubble behind the plate and may cause the air flowing over the opposite "upper" surface of the airfoil to stay attached to the surface of the airfoil longer. In other words, a Gurney flap may increase the circulation around the airfoil. As a result, installing a Gurney flap on a wing may increase the lift force generated by a wing.

Figure 8:
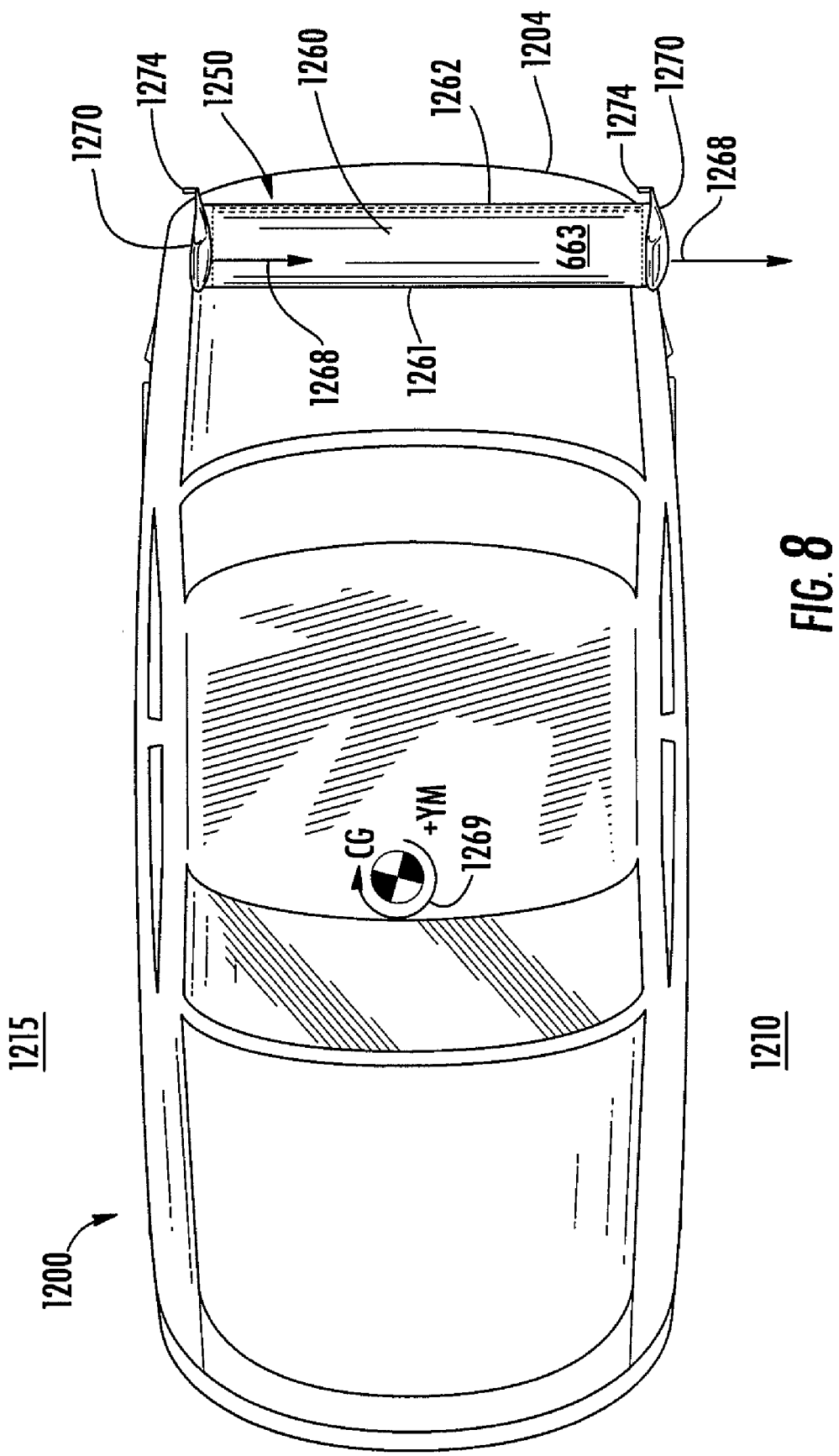
FIG. 8 is a top view of an automobile having Gurney flaps proximate the trailing edge of each sideforce controlling wing, in accordance with one embodiment of the present invention

For example, FIG. 8 illustrates a top view of an automobile 1200 having Gurney flaps 1274 proximate the trailing edge 1273 of each sideforce controlling wing 1270, in accordance with one embodiment of the present invention. In the illustrated embodiment, the sideforce controlling wings 1270 are configured to produce sideforces 1268 toward the driver side 1210 of the automobile. As such, Gurney flaps are positioned extending from the trailing edge 1273 of each sideforce controlling wing 1270 in the general direction of the passenger side 1215 of the automobile. In one embodiment of the present invention, a Gurney flap is removably attached to the trailing edge(s) of the sideforce controlling wing(s) so that the Gurney flap may be removed or replaced with a Gurney flap of a different length. In this way, the performance characteristics of the air deflecting system may be easily adjusted based, for example, on the requirements of a particular racetrack.

In certain embodiments of the present invention, the structure and position of the air deflecting system is fixed. In other embodiments, the structure and position of the air deflecting system may be adjusted when the automobile is not in motion. For example, the air deflecting system may be structured so that the downforce controlling wing(s) and/or the sideforce controlling wing(s) may be pivoted to various angles of attack. In other embodiments, downforce controlling wing(s) and/or the sideforce controlling wing(s) may be added or removed. In still other embodiments, the air deflecting system may include flaps or slats that are manually adjustable and/or removable.

In yet other embodiments of the present invention, the air deflecting system may be adjusted when the automobile is moving. In such embodiments, the adjustments to the air deflecting system may be controlled by the driver, automatically controlled by an onboard computer receiving input from various sensors, or remotely controlled by third party such as a racing crew chief or other operator. One exemplary method of control may be to increase the angle of attack of the sideforce controlling wings based on the direction that the automobile is turning, the speed or extent of the automobile's turn, and/or the yaw angle of the automobile. Another exemplary method of control may be to deploy one or more flaps along one or more of the wings based on the direction that the automobile is turning, the speed or extent of the automobile's turn, and/or the yaw angle of the automobile.

Automatic control of air deflecting systems according to one embodiment may involve use of an accelerometer to determine when the automobile is proceeding around a curve. A computer or other onboard controller may adjust the angle of attack of the sideforce controlling wings or deploy flaps based on the direction and magnitude of any accelerations detected by the accelerometer. In this way, the air deflecting system may be configured to produce a greater sideforce when needed (i.e., during cornering) and remove such greater sideforce when not needed (i.e., when not cornering). Such a system may have the advantage over a fixed air deflecting system in that unnecessary drag may be avoided at times when the automobile does not require additional sideforce.

Figure 9A:
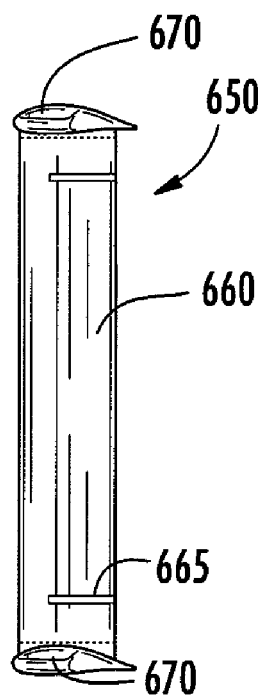
FIG. 9A is a bottom view of the air deflecting system illustrated in FIGS. 6A-6D according to one embodiment of the present invention.
Figure 9B:
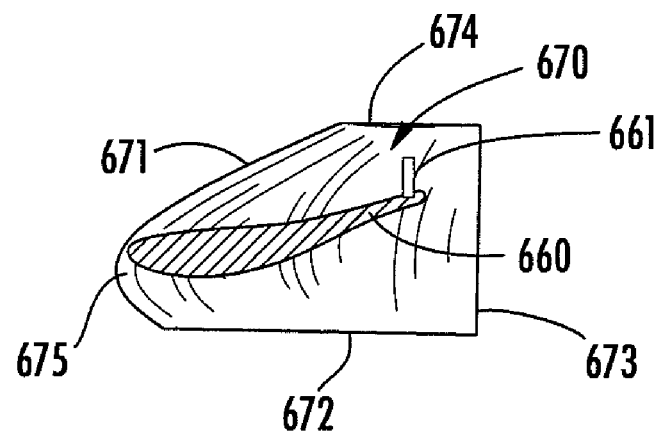
FIG. 9B is a side section view of the air deflecting system illustrated in FIGS. 6A-6D and 9A showing the sweep and taper of sideforce controlling wings according to one embodiment of the present invention.

Returning to the air deflecting system embodiment depicted in FIGS. 6A-D, in the illustrated embodiment, the leading edge 671 of the sideforce controlling wings 670 are swept while the trailing edge is positioned generally perpendicular to the top and bottom edges of the wings. For example, FIGS. 9A and 9B illustrate a bottom view and a side section view, respectively, of one example of such an air deflecting system 650. The air deflecting system 650 has two sideforce controlling wings 670 that have generally parallel top 674 and bottom 672 edges. The trailing edge 673 of each sideforce controlling wing 670 is generally perpendicular to the top and bottom edges 674 and 672. The leading edge 671 is swept back towards the trailing edge 673 from a point 675 located between the top and bottom edges 674 and 672 of the wing. Said differently, the sideforce controlling wings 670 are tapered towards the top 674 and bottom 672 of the wing. The top portion of the sideforce generating wing 670 is tapered more than the bottom portion. In the illustrated embodiment, the downforce controlling wing 1060 has a constant chord length that is greater than the chord length of the top edges 1072 of the sideforce controlling wings 1070, but is less than the maximum chord length of the sideforce controlling wings (the chord of the sideforce controlling wing 1070 at point 1075). Other sideforce generating wing stylizations will be apparent to one of ordinary skill in the art in view of the inventive concepts herein described.

Figure 10A:
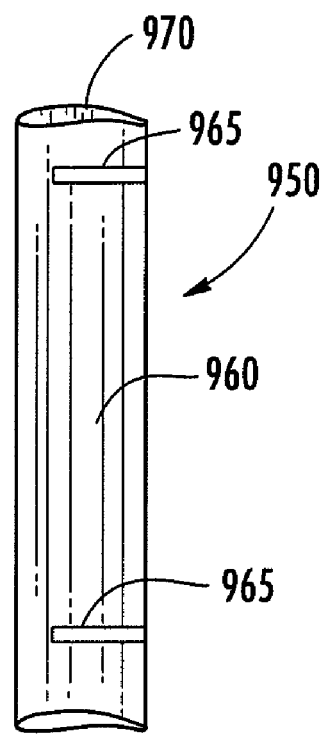
FIG. 10A is a bottom view of an air deflecting system according to one embodiment of the present invention.
Figure 10B:
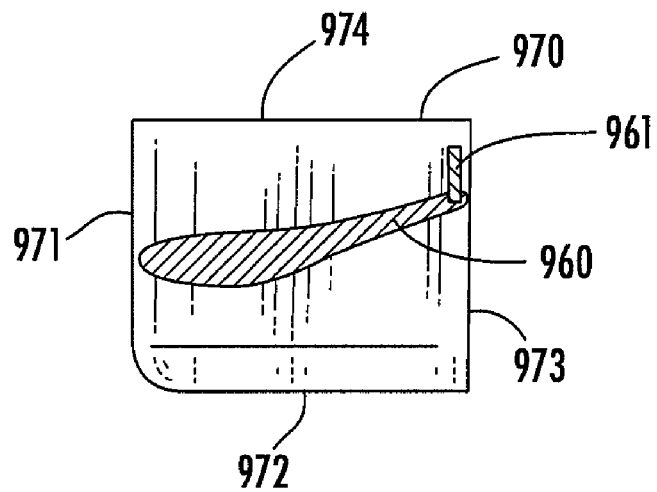
FIG. 10B is a side section view of the air deflecting system illustrated in FIG. 10A showing a rectangular un-swept sideforce controlling wing according to one embodiment of the present invention.

For example, FIGS. 10A and 10B illustrate a bottom view and a side section view, respectively, of another exemplary air deflecting system 950 in accordance with another embodiment of the present invention. FIG. 9B illustrates rectangular endplates having a generally constant chord length throughout. In other words, not only are the top 974 and bottom 972 edges of the sideforce controlling wing 970 parallel to one another, but the leading edge 971 and the trailing edge 973 are also parallel to one another. In one embodiment and as illustrated in FIG. 10B, the front lower corner of the sideforce controlling wing 970, or some other corner of the wing, is rounded, mainly for aesthetic purposes. FIG. 10B also illustrates a Gurney flap 960 extending from the downforce controlling wing 961.

Figure 11A:
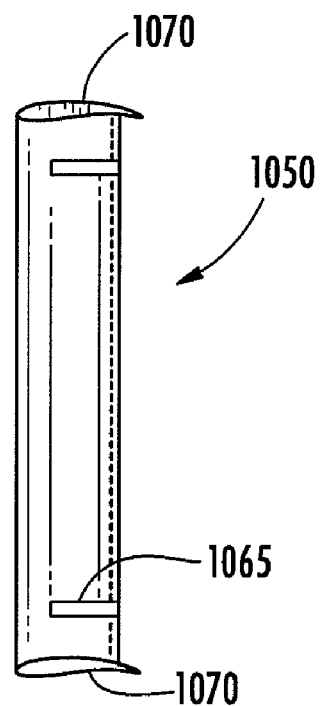
FIG. 11A is a top view of an air deflecting system according to one embodiment of the present invention.
Figure 11B:
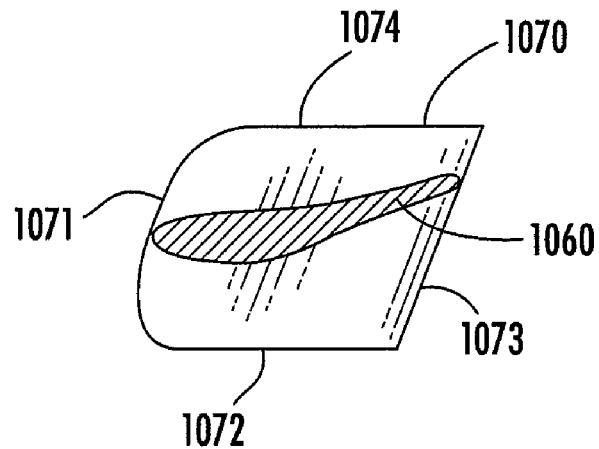
FIG. 11B is a side section view of the air deflecting system illustrated in FIG. 11A showing a swept un-tapered sideforce controlling wing according to one embodiment of the present invention.

FIGS. 11A and 11B illustrate a bottom view and a side section view, respectively, of another exemplary air deflecting system 1050 in accordance with another embodiment of the present invention. In the illustrated embodiment, the sideforce controlling wings 1070 are swept so that leading 1071 and trailing edges 1073 of the wings are not perpendicular to the top 1074 and bottom 1072 edges of the wings as shown. FIG. 11B illustrates the sweep in one of the sideforce controlling wings 1070 according to one embodiment of the present invention. In one embodiment, such as in the illustrated embodiment, the front upper and lower corners are rounded, mainly for aesthetic purposes.

In some embodiments, the sideforce controlling wings may have a uniform cross-section along the span of the wing or the airfoil may be twisted or vary in shape along the span of the wing. Such variations in the sideforce controlling wings may be made in order to alter the aesthetics of the automobile and/or to alter the aerodynamic properties of the air deflecting system as will be apparent to a person skilled in the art.

In some embodiments of the present invention having two sideforce controlling wings extending from the ends of a downforce controlling wing, the sideforce controlling wings may be "blended" or extend smoothly into the downforce controlling wing. Blending the wings or otherwise smoothing the transition between the sideforce controlling and downforce controlling wings may improve the performance of the air deflecting system, for example, by reducing the drag caused by the air deflecting system.

The air deflecting system may be comprised of metallic materials, polymeric materials, composite materials, fiberglass, carbon fiber, epoxy, wood, or any other suitable material. For racecar applications, the air deflecting system is preferably comprised of a light-weight material such as carbon fiber, Kevlar, fiberglass, other fiber-reinforced composites, aluminum, and other similar materials. In one embodiment, the sideforce controlling wings have the same cross section and chord length as the downforce controlling wing.

Although the exemplary embodiment of the air deflecting system illustrated in FIGS. 6A-6D show an air deflecting system comprised of two sideforce controlling wings each having cambered airfoils with the maximum camber directed towards the driver's side of the automobile, other configurations of the present invention are also possible. For example, in one embodiment, the air deflecting system may be structured with only one sideforce controlling wing and the sideforce controlling wing may be centrally located on the automobile. In other embodiments, the air deflecting system is structured to have more than two sideforce controlling wings. The one or more sideforce controlling wings may all be structured so that the maximum camber of each wing is directed towards one side of the automobile or the other depending on whether a positive or negative side force (or a positive or negative yawing moment) is desired.

Where the air deflecting system has more than one sideforce controlling wing, one sideforce controlling wing may be cambered in one direction and another sideforce controlling wing may be cambered in an opposite direction. For example, an air deflecting system configured such that both wings produce sideforce in the same direction when the automobile is yawed and/or when the automobile is not yawed (e.g., the embodiment depicted in FIGS. 6A-6D) may be particularly suited for an automobile that turns mostly in the same direction. For example, a racecar configured for a typical NASCAR® track where the cars primarily make left-hand turns may benefit from having sideforce controlling wings that produce sideforce towards one side of the automobile only.

However, a racecar intended for a "road" course where the course has turns in both directions may benefit from the air deflecting system configured such that beneficial sideforce is created when the car is going around both left- and right-hand turns. For example, in one embodiment, an air deflecting system may comprise two sideforce controlling wings. Each sideforce controlling wing may be positioned on the automobile such that the airfoil of each wing is angled such that the leading edges of the airfoils are positioned closer to the longitudinal axis of the automobile than the trailing edges of the airfoils. In this configuration, when the automobile is not yawed relative to the incoming flow, the sideforce controlling wings may each produce a sideforce directed in the opposite direction of the sideforce generated by the other wing. As such, the air deflecting system could be configured such that the side forces would cancel each other out and only a net drag force would be added to the automobile when the automobile is not yawed. When the automobile is yawed in one direction or the other, one sideforce controlling wing would be at a higher angle of attack relative to the impinging flow compared to when the automobile is not yawed and therefore would produce a greater sideforce. However, for at least small yaw angles (i.e., pre-stall angles of attack), the other wing would be at a lower angle of attack relative to the impinging flow compared to when the automobile is not yawed and would therefore produce less sideforce. As such, the net sideforce of the two sideforce controlling wings would be directed to a single direction (i.e., a driver's side direction if the automobile is positioned at a negative yaw angle relative to an impinging airflow and a passenger's side direction if the automobile is positioned at a positive yaw angle relative to an impinging airflow.

Exemplary Embodiment

As described in detail above, various embodiments of the present invention are directed to air deflecting systems adapted for attachment to an automobile in order to reduce unfavorable yawing moments and/or rolling moments produced during high speed cornering. In one exemplary embodiment, an air deflecting system structured on the automobile generally as illustrated in FIG. 6A but having sideforce controlling wings as illustrated in FIGS. 10A and 10B was attached to an automobile proximate the rear end of the automobile and the automobile was tested in a wind tunnel. Upon installation, the chords of the sideforce controlling airfoils were substantially aligned with the longitudinal axis of the automobile. The automobile was tested in a wind tunnel at an air velocity of approximately 110 miles per hour and at a dynamic pressure of 30.95 pounds per square foot. As is the standard practice in the industry, the forces and moments were scaled up to 200 miles per hour using a dynamic pressure of 102.31 pounds per square foot. The automobile was yawed relative to the impinging airflow at various yaw angles (e.g., 0°, −3°, and −6°) and tested with and without the air deflecting system installed.

Figure 1:
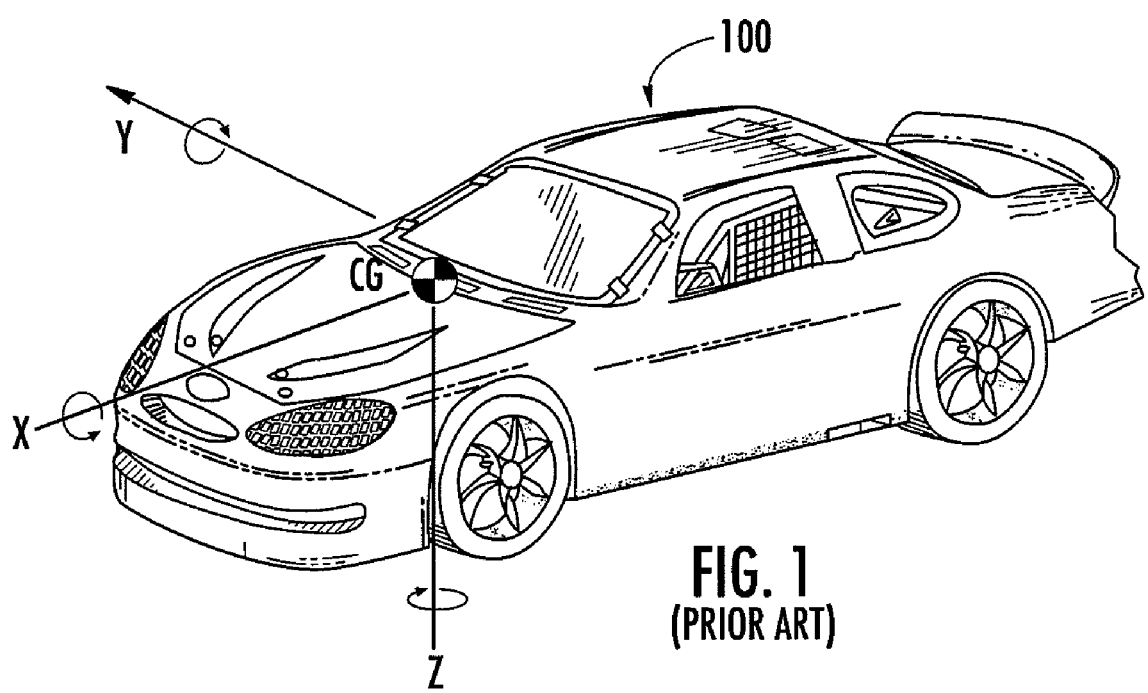
FIG. 1 is a perspective view of a conventional automobile illustrating a coordinate system for modeling aerodynamic forces in accordance with the known prior art.
Figure 2A:
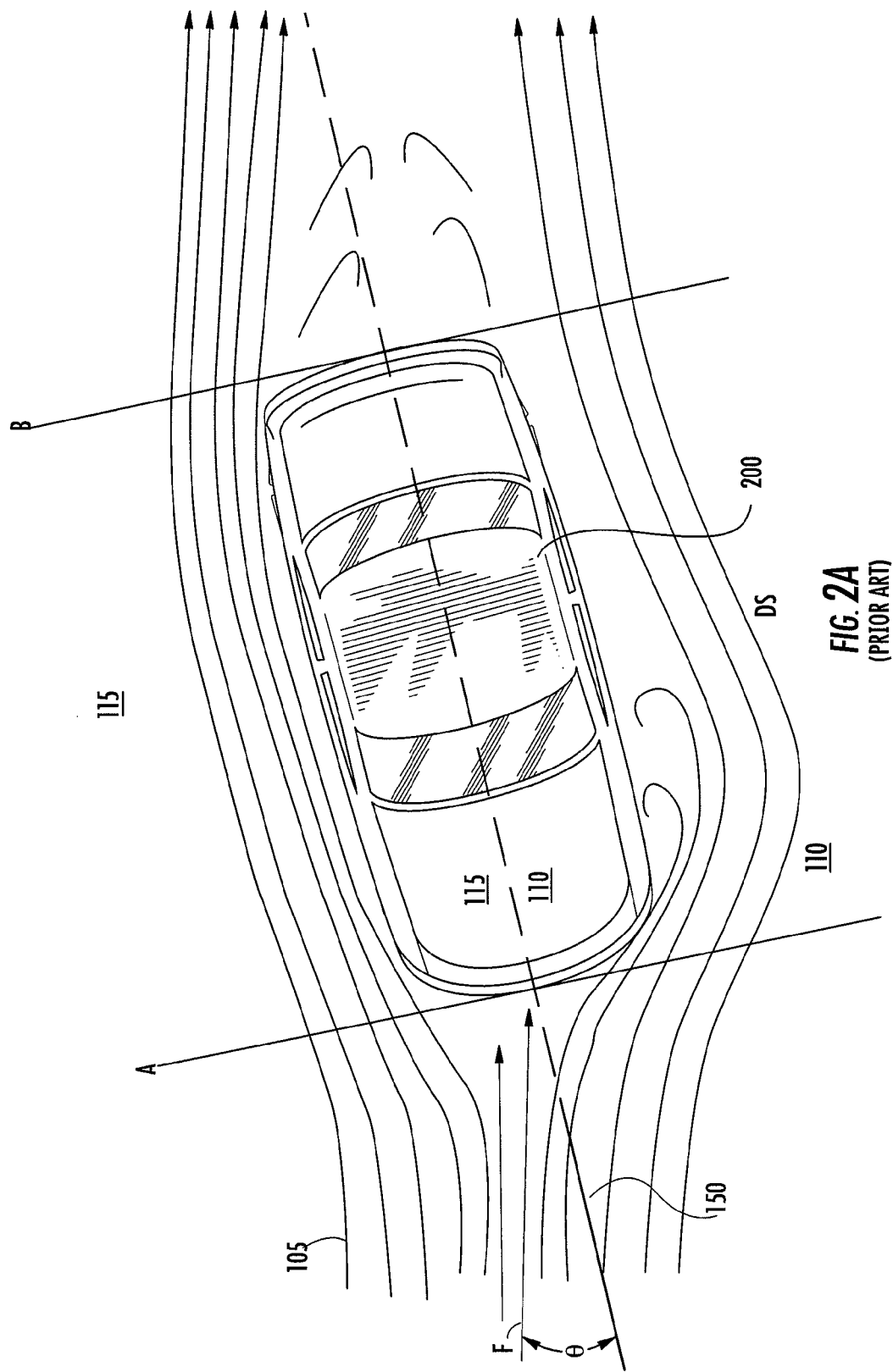
FIG. 2A is a simplified schematic illustration of an impinging air flow proceeding around a conventional automobile having a longitudinal axis that is skewed, or yawed, at an angle θ relative to the impinging air flow.
Figure 2B:
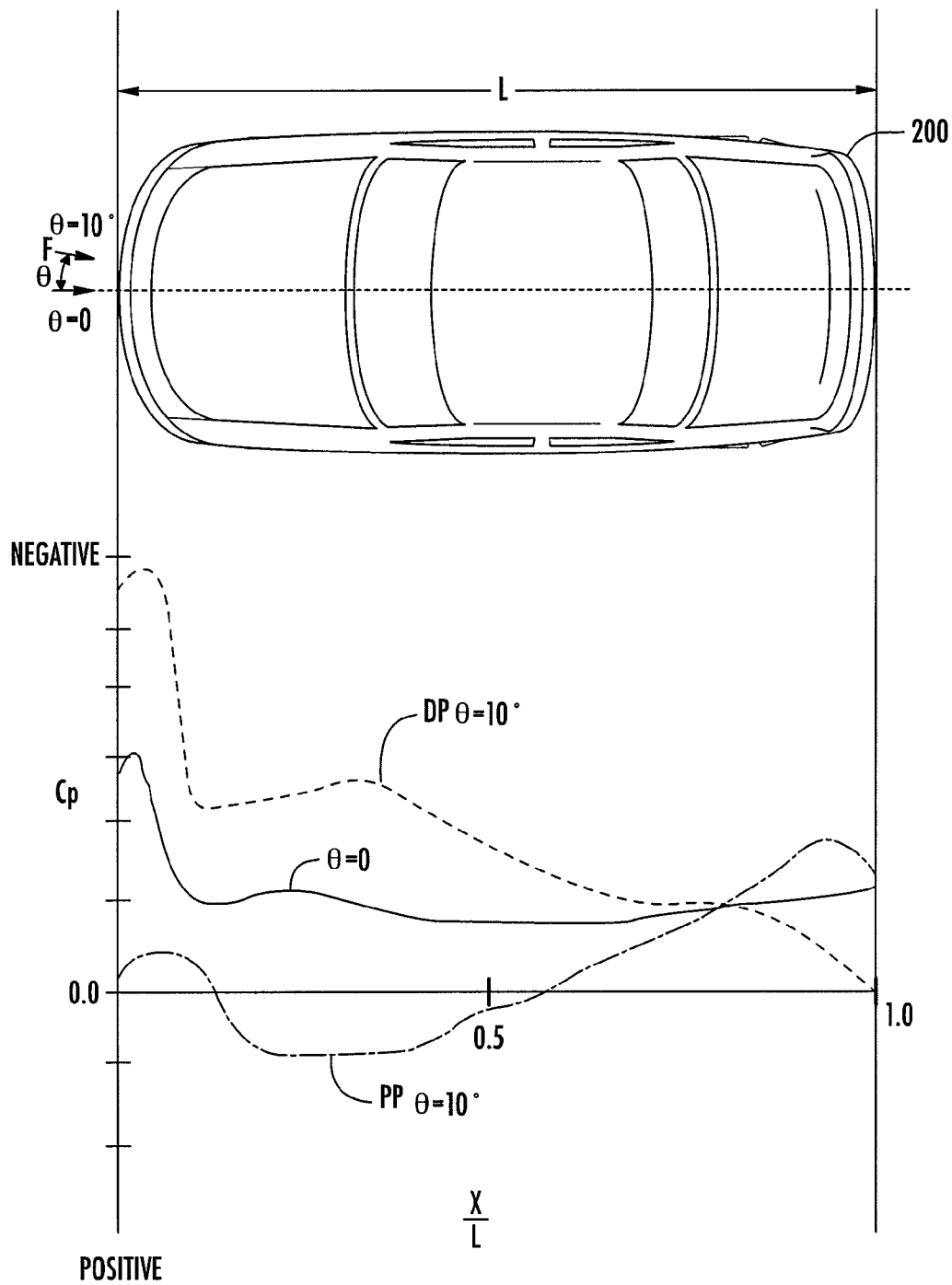
FIG. 2B is simplified illustration of the relative pressure profiles produced by passenger side and driver side air flows as they intercept the yawed automobile depicted in FIG. 2A.
Figure 3A:
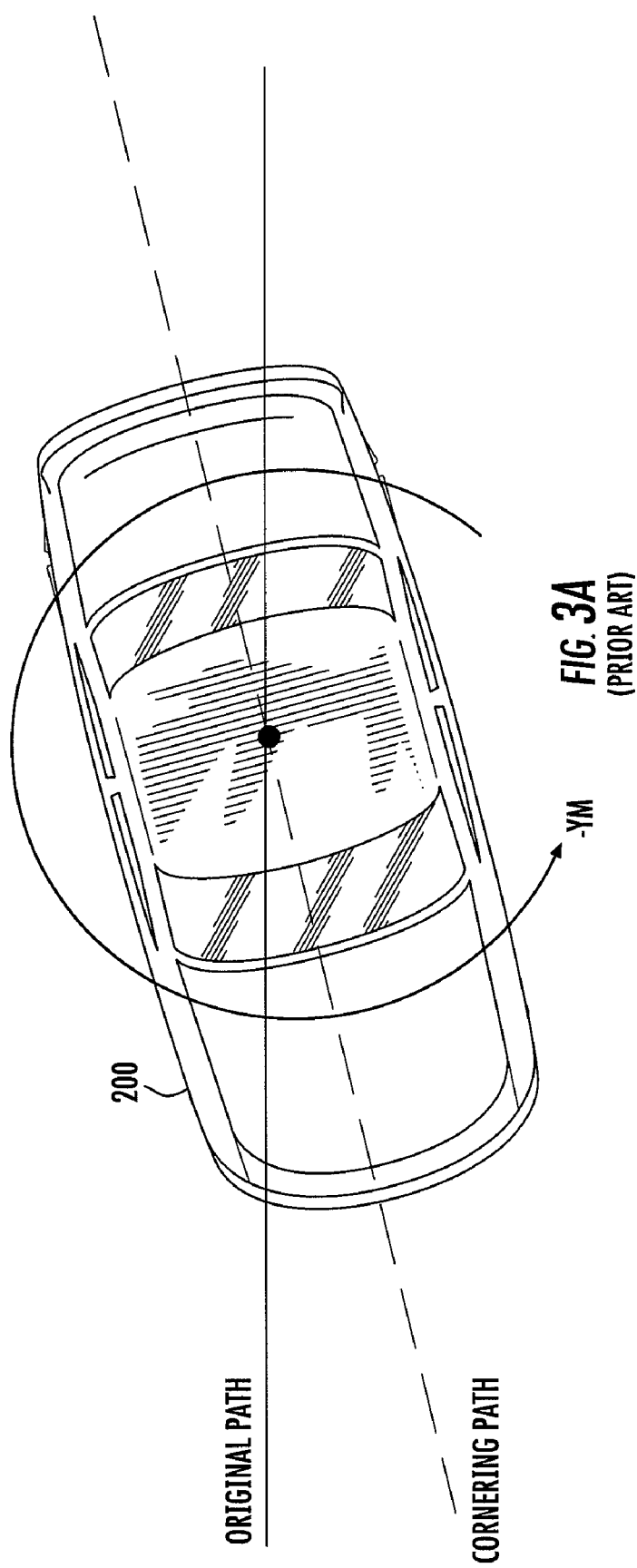
FIG. 3A is a top schematic illustration of a negative yawing moment applied to a yawed automobile as a result of the pressure profiles depicted in FIG. 2B.
Figure 3B:
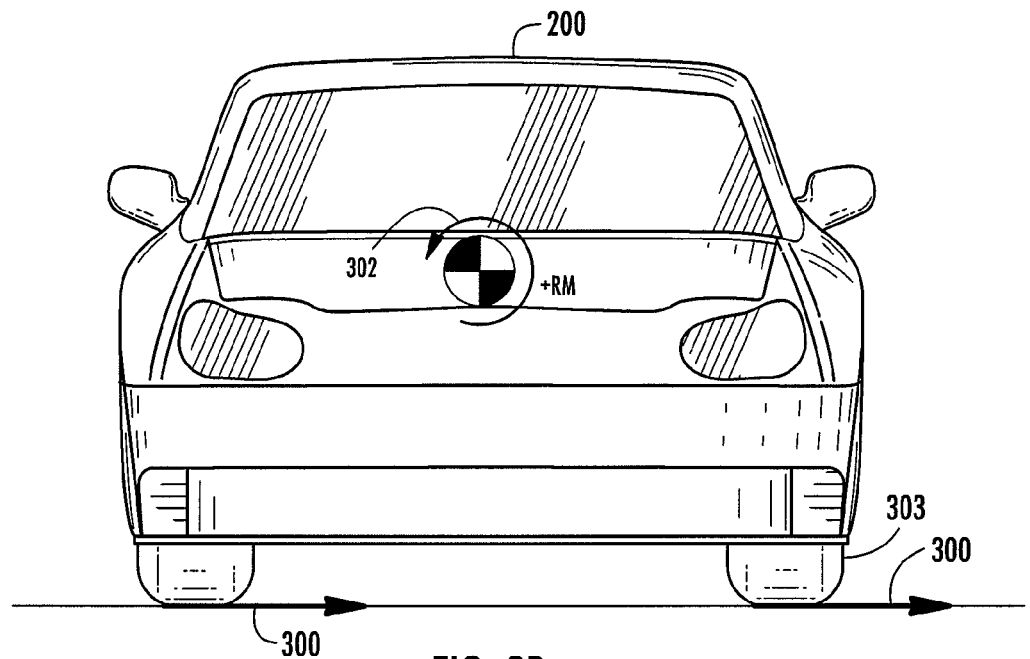
FIG. 3B is a front schematic illustration of a positive rolling moment applied to a cornering automobile as a result of the forces generated on the automobile by the tires gripping the surface of the road.
Figure 3C:
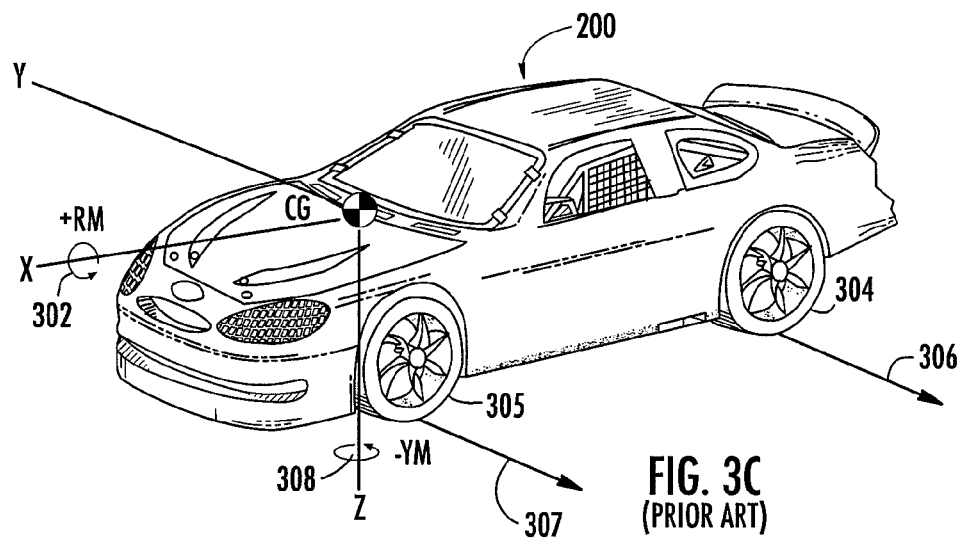
FIG. 3C is a perspective view of a conventional automobile illustrating various moments generated about an automobile's center of gravity due to the aerodynamic forces and certain forces generated by tires of a cornering automobile.

The automobile was first tested without the air deflecting system but with a conventional spoiler such as the spoiler illustrated in FIG. 1. The conventional spoiler was then removed and the automobile was tested with a downforce controlling wing (10.75 inch chord and 57 inches long at approximately 10 degrees angle of attack) having an inverted cambered airfoil and having rectangular flat endplates (4.5 inches high, eleven inches long, and 0.063 inches thick). Two sideforce controlling wings (8 inches high and 10.75 inches long) were then added as endplates of the downforce controlling wing. The airfoil used for the cross-sections of both the sideforce controlling wings and the downforce controlling wing was the Liebeck LA5401E cambered airfoil having a slightly thicker trailing edge. The sideforce controlling wings had cambered cross-sections both with the maximum camber on the driver's side of the chord line (the negative y-side).

The two sideforce controlling wings were first positioned so that the airfoil chords were substantially parallel to the longitudinal axis of the automobile. The automobile was tested in this configuration and then in this configuration with half-inch Gurney flaps ("GF") on each of the sideforce controlling wings. This configuration was then tested with the right hand ("RH") (i.e., passenger side) sideforce controlling wing positioned at various other angles of attack (approximately 2.7°, 5.3°, 8.0°). The results of these tests are provided in Table 2 below. The table shows the values of the yawing moment, rear side force, and the downforce. The table also shows values for the non-dimensional yawing moment coefficient $C_{YM}$ and the rolling moment coefficient $C_{RM}$. These coefficients are calculated by dividing the moments (foot-pounds force) by the product of the dynamic pressure (102.31 pounds force per square foot), the frontal area of the automobile (24.11 square feet), and the wheelbase (9.17 feet).

TABLE 2

| Configuration | Yaw Angle (°) | $C_{YM}$ | Yawing Moment (foot-lbs force) | $C_{RM}$ | Rear Side Force (lbs force) | Downforce (lbs force) |
|---|---|---|---|---|---|---|
| w/ Spoiler | 0 | 0.0235 | 531 | −0.0001 | −79 | 1057 |
| w/ Spoiler | −3 | 0.0132 | 299 | −0.0097 | −204 | 1121 |
| w/ Spoiler | −6 | −0.0055 | −124 | −0.0184 | −305 | 1160 |
| w/ Horizontal Wing | 0 | 0.0131 | 295 | −0.0009 | −39 | 1020 |
| w/ Horizontal Wing | −3 | 0.0051 | 115 | −0.0119 | −168 | 1057 |
| w/ Horizontal Wing | −6 | −0.0108 | −244 | −0.0231 | −278 | 1086 |
| w/ Endplates 0° | 0 | 0.0209 | 473 | −0.0031 | −71 | 1054 |
| w/ Endplates 0° | −3 | 0.0143 | 323 | −0.0149 | −207 | 1098 |
| w/ Endplates 0° | −6 | −0.0003 | −6 | −0.0274 | −321 | 1099 |
| w/ Endplates w/ 0.5-inch GF | 0 | 0.0289 | 654 | −0.0055 | −103 | 1127 |
| w/ Endplates w/ 0.5-inch GF | −3 | 0.0205 | 464 | −0.0179 | −238 | 1164 |
| w/ Endplates w/ 0.5-inch GF | −6 | 0.0113 | 256 | −0.0310 | −363 | 1170 |
| w/ Endplates w/ GF and RH = 2.7° | 0 | 0.0313 | 708 | −0.0061 | −113 | 1137 |
| w/ Endplates w/ GF and RH = 2.7° | −3 | 0.0224 | 507 | −0.0185 | −246 | 1172 |
| w/ Endplates w/ GF and RH = 2.7° | −6 | 0.0136 | 308 | −0.0316 | −375 | 1176 |
| w/ Endplates w/ GF and RH = 5.3° | 0 | 0.0336 | 759 | −0.0063 | −120 | 1150 |
| w/ Endplates w/ GF and RH = 5.3° | −3 | 0.0250 | 565 | −0.0188 | −256 | 1176 |
| w/ Endplates w/ GF and RH = 5.3° | −6 | 0.0164 | 370 | −0.0328 | −386 | 1179 |
| w/ Endplates w/ GF and RH = 8.0° | 0 | 0.0351 | 793 | −0.0066 | −128 | 1152 |
| w/ Endplates w/ GF and RH = 8.0° | −3 | 0.0271 | 614 | −0.0194 | −264 | 1187 |
| w/ Endplates w/ GF and RH = 8.0° | −6 | 0.0179 | 405 | −0.0330 | −393 | 1190 |

Other embodiments of the air deflecting system were also tested in a wind tunnel under similar conditions. Table 3 shows the test results of an air deflecting system having a downforce controlling wing and stylized sideforce controlling wing endplates structured as illustrated in FIGS. 6 and 9. Referring to FIGS. 9A and 9B, the lower edge 672 chord lengths of the side force controlling wings 670 were 10.75 inches long as was the chord length of the downforce controlling wing 660. The trailing edge 673 of the sideforce controlling wings 670 were 8 inches long. The upper edge 674 chord length of the side force controlling wings 670 were 6.75 inches long. The upper portions of the leading edges 671 were 8.5 inches long and the lower portions of the leading edges 671 were 3.25 inches long. The maximum chord lengths of the sideforce controlling wings 670 at points 675 were 12.5 inches. The span of the downforce controlling wing 660 was 54 inches long. (Table 3 compares these test results to test results of an air deflecting system having a downforce controlling wing with flat rectangular endplates (8 inches high, 10.75 inches long, and 0.09 inches thick). Both sets of endplates were tested at approximately a zero degree angle of attack with respect to the longitudinal axis of the automobile.

TABLE 3

| Configuration | Yaw Angle (°) | $C_{YM}$ | Yawing Moment (foot-lbs force) | $C_{RM}$ | Rear Side Force (lbs force) | Downforce (lbs force) |
| --- | --- | --- | --- | --- | --- | --- |
| w/ Flat Rectangular Endplates | 0 | 0.0093 | 211 | 0.0023 | −23 | 1034 |
| w/ Flat Rectangular Endplates | −3 | 0.0032 | 72 | −0.0130 | −161 | 1054 |
| w/ Stylized Endplates | 0 | 0.0153 | 347 | 0.0000 | −48 | 1067 |
| w/ Stylized Endplates | −3 | 0.0089 | 200 | −0.0139 | −184 | 1084 |

Table 4 compares the sideforce controlling wings of Table 2 with the stylized sideforce controlling wings of Table 3. Both sets of endplates were tested at a zero degree angle of attack relative to the longitudinal axis of the automobile.

TABLE 4

| Configuration | Yaw Angle (°) | $C_{YM}$ | Yawing Moment (foot-lbs force) | $C_{RM}$ | Rear Side Force (lbs force) | Downforce (lbs force) |
| --- | --- | --- | --- | --- | --- | --- |
| w/ Rectangular Endplates | 0 | 0.0148 | 335 | 0.0003 | −47 | 1030 |
| w/ Rectangular Endplates | −3 | 0.0075 | 171 | −0.0141 | −181 | 1042 |
| w/ Rectangular Endplates | −6 | 0.0004 | 10 | −0.0277 | −307 | 1028 |
| w/ Stylized Endplates | 0 | 0.0150 | 340 | −0.0004 | −46 | 1032 |
| w/ Stylized Endplates | −3 | 0.0082 | 186 | −0.0148 | −183 | 1041 |
| w/ Stylized Endplates | −6 | 0.0010 | 23 | −0.0283 | −310 | 1027 |

Table 5 compares test results of the stylized endplates illustrated in FIGS. 9A and 9B with test results of flat endplates (0.09 inches thick) having the same profile of the stylized endplates. Both sets of endplates were tested at a zero degree angle of attack relative to the longitudinal axis of the automobile.

TABLE 5

| Configuration | Yaw Angle (°) | $C_{YM}$ | Yawing Moment (foot-lbs force) | $C_{RM}$ | Rear Side Force (lbs force) | Downforce (lbs force) |
| --- | --- | --- | --- | --- | --- | --- |
| w/ Flat Endplates w/ Stylized Profile | 0 | 0.0050 | 117 | 0.0000 | −39 | 833 |
| w/ Flat Endplates w/ | −3 | 0.0010 | 23 | −0.0150 | −195 | 877 |

TABLE 5-continued

| Configuration | Yaw Angle (°) | $C_{YM}$ | Yawing Moment (foot-lbs force) | $C_{RM}$ | Rear Side Force (lbs force) | Downforce (lbs force) |
|---|---|---|---|---|---|---|
| Stylized profile w/ Stylized Endplates | 0 | 0.0120 | 280 | −0.0030 | −68 | 841 |
| w/ Stylized Endplates | −3 | 0.0060 | 140 | −0.0170 | −215 | 877 |

Table 6 compares rectangular endplates having a highly cambered airfoil cross-section (8 hinges high, 10.75 inches long) with flat rectangular endplates (4.5 inches high, eleven inches long, and 0.063 inches thick). Both sets of endplates were tested at a zero degree angle of attack relative to the longitudinal axis of the automobile.

TABLE 6

| Configuration | Yaw Angle (°) | $C_{YM}$ | Yawing Moment (foot-lbs force) | $C_{RM}$ | Rear Side Force (lbs force) | Downforce (lbs force) |
|---|---|---|---|---|---|---|
| w/ Flat Rectangular Endplates | 0 | 0.0110 | 249 | −0.0020 | −67 | 797 |
| w/ Flat Rectangular Endplates | −3 | −0.0010 | −23 | −0.0150 | −203 | 831 |
| w/ Flat Rectangular Endplates | −6 | −0.0160 | −362 | −0.0280 | −318 | 861 |
| w/ Highly Cambered Rectangular Endplates | 0 | 0.0350 | 791 | −0.0110 | −160 | 799 |
| w/ Highly Cambered Rectangular Endplates | −3 | 0.0230 | 520 | −0.0240 | −298 | 849 |
| w/ Highly Cambered Rectangular Endplates | −6 | 0.0090 | 204 | −0.0380 | −416 | 868 |

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An air deflecting system for an automobile having a center of gravity that is adapted to turn in a turn direction, the air deflecting system comprising:
a first sideforce controlling wing extending from the automobile, wherein the first sideforce controlling wing defines a cross-section shaped as an airfoil and is structured to generate aerodynamic forces having a first sideforce component when the automobile is generally aligned with an impinging airflow and a second sideforce component that is greater than the first sideforce component when the automobile is yawed in the turn direction relative to the impinging airflow,
wherein the air deflecting system applies a non-zero first yawing moment to the automobile when the automobile is generally aligned with the impinging airflow and a non-zero second yawing moment to the automobile that is greater than the first yawing moment when the automobile is yawed in the turn direction relative to the impinging airflow.

2. The air deflecting system of claim 1, wherein the first sideforce controlling wing has a non-zero lift coefficient at a zero-degree angle of attack.

3. The air deflecting system of claim 1, further comprising a downforce controlling wing structured to generate aerodynamic forces having a downforce component.

4. The air deflecting system of claim 1, wherein the sideforce controlling wing comprises a gurney flap.

5. The air deflecting system of claim 1, wherein the first sideforce controlling wing is positioned rearward of the automobile's center of gravity.

6. The air deflecting system of claim 5, further comprising a second sideforce controlling wing positioned rearward of the automobile's center of gravity, wherein positioning the automobile in a −3 degree yawed position relative to the impinging airflow produces a yawing moment coefficient, and wherein the yawing moment coefficient associated with the automobile having the first and second sideforce controlling wings is between about 0.0050 and about 0.0300 greater than a yawing moment coefficient produced by the automobile without the first and second sideforce controlling wings.

7. An air deflecting system for an automobile having a longitudinal axis that is adapted to turn in a turn direction, the air deflecting system comprising:
first and second sideforce controlling wings extending from the automobile,
wherein the first sideforce controlling wing is structured to generate aerodynamic forces having a first sideforce component when the automobile is generally aligned with an impinging airflow, wherein the second sideforce controlling wing is structured to generate aerodynamic forces having a second sideforce component when the automobile is generally aligned with the impinging airflow, and wherein the first and second sideforce components are each generally directed toward a first side of the automobile.

8. The air deflecting system of claim 7, wherein the first and second sideforce controlling wings each define respective leading and trailing edges, wherein the leading edge of the first sideforce controlling wing is positioned closer to the longitudinal axis of the automobile than the trailing edge of the first sideforce controlling wing, and wherein the trailing edge of the second sideforce controlling wing is positioned closer to the longitudinal axis of the automobile than the leading edge of the second sideforce controlling wing.

9. The air deflecting system of claim 8, wherein the first and second sideforce controlling wings are generally parallel to one another.

10. The air deflecting system of claim 7, wherein the first sideforce controlling wing is structured to generate aerodynamic forces having a third sideforce component that is greater than the first sideforce component when the automobile is yawed in the turn direction relative to the impinging airflow, and wherein the second sideforce controlling wing is structured to generate aerodynamic forces having a fourth sideforce component that is greater than the second sideforce component when the automobile is yawed in the turn direction relative to the impinging airflow.

11. The air deflecting system of claim 10, wherein the first, second, third, and fourth sideforce components are all directed generally toward the first side of the automobile.

12. The air deflecting system of claim 1, further comprising a downforce controlling wing defining first and second ends and a second sideforce controlling wing, wherein the downforce controlling wing is coupled to the automobile and the first and second sideforce controlling wings are coupled to the downforce controlling wing proximate the first and second ends respectively.

13. The air deflecting system of claim 12, wherein the first sideforce controlling wing is structured to generate aerodynamic forces having a first sideforce component when the automobile is generally aligned with an impinging airflow, and wherein the second sideforce controlling wing is structured to generate aerodynamic forces having a second sideforce component when the automobile is generally aligned with the impinging airflow.

14. The air deflecting system of claim 13, wherein the first sideforce component and the second sideforce component are directed toward a first side of the automobile.

15. The air deflecting system of claim 12, wherein the first sideforce controlling wing and the second sideforce controlling wing are structured to generate aerodynamic forces having a combined sideforce component directed toward a first side of the automobile when the automobile is yawed in the turn direction relative to the impinging airflow.

16. The air deflecting system of claim 12, wherein at least one of the first and second sideforce controlling wings define an angle of attack that is configured for position adjustment relative to the automobile by a user.

17. The air deflecting system of claim 12, wherein the second sideforce controlling wing defines a cross-section shaped as an airfoil, and wherein the airfoil shaped cross-sections of the first sideforce controlling wing and the second sideforce controlling wing each comprise a cambered airfoil shape, and wherein the first sideforce controlling wing is cambered in generally the same direction as the second sideforce controlling wing.

18. The air deflecting system of claim 12, wherein the first sideforce controlling wing defines a cross-section shaped as a cambered airfoil for producing a first lift force at a zero angle of attack, wherein the airfoil of the second sideforce controlling wing is a cambered airfoil for producing a second lift force at a zero angle of attack, and wherein the first and second lift forces produced by the first and second sideforce controlling wings are directed generally in the same direction.

19. An air deflecting system for an automobile having a longitudinal axis disposed between first and second sides of the automobile, the air deflecting system comprising:
a first sideforce controlling wing extending from the automobile, wherein the first sideforce controlling wing comprises a cambered airfoil shape inherently possessing a first wing chord line and a first wing mean camber line, wherein the cambered airfoil shape of the first sideforce controlling wing is structured such that the first wing mean camber line is positioned nearer to the longitudinal axis than the first wing chord line; and
a second sideforce controlling wing extending from the automobile, wherein the second sideforce controlling wing comprises a cambered airfoil shape inherently possessing a second wing chord line and a second wing mean camber line, wherein the cambered airfoil shape of the second sideforce controlling wing is structured such that the second wing mean camber line is positioned farther from the longitudinal axis than the second wing chord line.

20. The air deflecting system of claim 19, further comprising a downforce controlling wing defining first and second ends, wherein the downforce controlling wing is coupled to the automobile and the first and second sideforce controlling wings are coupled to the downforce controlling wing proximate the first and second ends respectively.

21. The air deflecting system of claim 19, wherein the first sideforce controlling wing and the second sideforce controlling wing define cambered airfoil shapes that are substantially identical.

22. The air deflecting system of claim 7, further comprising a downforce controlling wing defining first and second ends, wherein the downforce controlling wing is coupled to the automobile and the first and second sideforce controlling wings are coupled to the first and second ends of the downforce controlling wing, respectively.

* * * * *